US008971290B2

(12) United States Patent
Liang et al.

(10) Patent No.: US 8,971,290 B2
(45) Date of Patent: Mar. 3, 2015

(54) HANDOVER METHOD SUPPORTING TERMINAL MOBILITY

(75) Inventors: Huarui Liang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 13/103,314

(22) Filed: May 9, 2011

(65) Prior Publication Data

US 2011/0274087 A1 Nov. 10, 2011

(30) Foreign Application Priority Data

May 10, 2010 (CN) .......................... 2010 1 0175987
Jul. 20, 2010 (CN) .......................... 2010 1 0234849

(51) Int. Cl.
*H04W 36/00* (2009.01)
*H04W 76/06* (2009.01)
*H04W 28/04* (2009.01)
*H04W 28/06* (2009.01)
*H04W 36/08* (2009.01)
*H04W 72/00* (2009.01)
*H04W 76/02* (2009.01)

(52) U.S. Cl.
CPC ............ *H04W 76/064* (2013.01); *H04W 28/04* (2013.01); *H04W 28/06* (2013.01); *H04W 36/08* (2013.01); *H04W 72/00* (2013.01); *H04W 76/028* (2013.01)
USPC .......................................................... 370/331

(58) Field of Classification Search
USPC .......................................................... 370/331
See application file for complete search history.

(56) References Cited

U.S. PATENT DOCUMENTS

2010/0113022 A1* 5/2010 Motegi et al. ................. 455/436
2010/0165867 A1* 7/2010 Nylander et al. ............. 370/252
2011/0075675 A1* 3/2011 Koodli et al. ................. 370/401

FOREIGN PATENT DOCUMENTS

KR 10-2007-0025964 A 3/2007
KR 10-0833109 B1 5/2008

OTHER PUBLICATIONS

3rd Generation Partnership Project; Technical Specification Group Services and System Aspects; General Packet Radio Service (GPRS) Enhancements for Evolved Universal Terrestrial Radio Access Network (E-UTRAN) access (Release 9), 3GPP TS 23.401, vol. 9.4, Mar. 2010.
3rd Generation Partnership Project; Technical Specification Group Services and System Aspects; Local IP Access and Selected IP Traffic Offload (Release 10), 3GPP TS 23.829, vol. 1.0.1, Mar. 2010.

* cited by examiner

*Primary Examiner* — Huy D Vu
*Assistant Examiner* — Kevin Cunningham
(74) *Attorney, Agent, or Firm* — Jefferson IP Law, LLP

(57) ABSTRACT

A handover method for supporting terminal mobility is provided, wherein, before a target core network node updates bearer information, an access control determination procedure is added. According to the access control determination information provided by the target base station, if it is determined that the bearer supporting a SIPTO or LIPA service is permitted to perform the handover, the target core network node updates the bearer information. If it is determined that the bearer supporting the SIPTO or LIPA service is not allowed to perform the handover, the handover failure is notified as per the bearer not performing the handover, and the bearer information is not updated. Alternatively, during or after the handover to the target network, the bearer release or deactivation is performed for the bearer not performing the handover, so that the UE may re-initiate the bearer establishment process with respect to the bearer not performing the handover.

16 Claims, 16 Drawing Sheets

HANDOVER METHOD SUPPORTING TERMINAL MOBILITY

PRIORITY

This application claims the benefit under 35 U.S.C. §119 (a) of a Chinese patent application filed on May 10, 2010 in the Chinese Intellectual Property Office and assigned Serial No. 201010175987.2, and a Chinese patent application filed on Jul. 20, 2010 in the Chinese Intellectual Property Office and assigned Serial No. 201010234849.7, the entire disclosures of which are hereby incorporated by reference.

BACKGROUND OF THE INVENTION

1. Field of the Invention

The present invention relates to wireless communication technologies. More particularly, the present invention relates to a handover method that supports terminal mobility.

2. Background of the Invention

FIG. 1 is a diagram illustrating a System Architecture Evolution (SAE) system architecture of the related art. Specifically, User Equipment (UE) 101 is a terminal device for receiving data. An Evolved Universal Terrestrial Radio Access Network (E-UTRAN) 102 is a wireless access network, in which a macro base station evolved Node B (eNB) that provides the UE with an interface for accessing a wireless network is included. A Mobile Management Entity (MME) 103 is responsible for managing a mobile context, a session context, and security information of the UE. A Serving Gateway (SGW) 104 mainly provides a user-plane function, and the MME 103 and the SGW 104 may be located at the same physical entity. A Packet Data Network Gateway (PGW) 105 is responsible for a function such as charging, lawful interception, and the like, and can also be located at the same physical entity as the SGW 104. A Policy and Charging Rules Function (PCRF) entity 106 provides a Quality of Service (QoS) policy and a charging rule. A Serving General Packet Radio Service (GPRS) Support Node (SGSN) 108 is a network node device for providing transmission of the data with routing in a Universal Mobile Telecommunication System (UMTS). A Home Subscriber Server (HSS) 109 is a home sub-system of the UE, and is responsible for protecting user information including a current location of the UE, an address of a serving node, user security information, a packet data context of the UE, etc.

Along with an increased service data rate of the UE, an operator provides a new technique: Selected Internet Protocol (IP) Traffic Offload (SIPTO). That is, when accessing a particular service, the UE performs a handover to an access point closer to the wireless access network during movement, thus an investment cost of a transmission network is effectively reduced, and the high data rate is provided with a better service experience.

It is proposed in the 3rd Generation Partnership Project (3GPP) that the network must support a capability of Local IP Access (LIPA) and the SIPTO. Specifically, in the SIPTO, when the UE accesses the Internet or another external network through a home enhanced based station (Home enhanced Node B, HeNB), a home base station (Home Node B, HNB), or the macro base station, the network can select or reselect a user-plane node much closer to the wireless access network for the UE. The LIPA means that the UE accesses a home network or an intranet through the HeNB or the HNB. When the LIPA is executed, the user-plane node close to the home base station can be selected or reselected, or the user-plane node located in an HeNB/HNB access network can be selected, for the UE. Specifically, the user-plane node can be a core network device or a gateway, and for the SAE system, it can be the SGW or the PGW or a Local Gateway (LGW), while for the UMTS, can be the SGSN or a Gateway GPRS Support Node (GGSN).

An existing handover procedure of the related art can be as shown in FIG. 2, and mainly includes the following steps.

At step 201, a source base station determines to perform a handover.

At step 202, the source base station sends a handover request to a source MME. In the handover request, target base station information, e.g. a target base station ID and a target Tracking Area ID (TAI), is included, and information such as a target Closed Subscriber Group (CSG) or a handover type can also be included.

At step 203, the source MME sends a forward handover request to a target MME. The target base station information obtained from the handover request and the like is included in the forward handover request.

At step 204, if the target MME reselects the SGW for the UE, a session establishment process is executed with the reselected target SGW. The Target MME sends a Session Establishment Request to a Target SGW, and the Target SGW sends a Session Establishment Reply to the Target MME.

If it is not required to reselect the SGW for the UE, there is no need to execute step 204.

At step 205, the target MME sends the handover request to a target base station.

At step 206, the target base station replies to the target MME with a handover request acknowledgement message.

At step 207, the target MME updates bearer information according to the target base station to which the UE performs the handover, which can specifically include requesting establishment of a user-plane tunnel between the target base station and the LGW.

In the existing handover procedure described above, the following situations may be presented.

First, a successful handover cannot be ensured when the handover is performed. For example, after the UE is moved, the target base station is not allowed to access the LGW currently accessed by the source base station. Or, when the UE performs the handover from an enterprise network to another network, the UE is not allowed to have such a handover, which may cause handover failure. However, in accordance with the existing handover procedure, the target MME can determine the handover failure and release a wireless resource having been established or occupied only during the user-plane tunnel establishment. Such a manner can occupy excessive signaling resources and wireless resources.

Second, when the handover is performed, although the handover can be successful, an optimal bearer cannot be ensured after the handover. For example, when the UE has the handover, the handover to outside of the enterprise network is performed. Although the policy of the operator allows having the handover, the bearer after the handover might not be the optimal bearer, which may cause network resources to not be used optimally.

SUMMARY OF THE INVENTION

An aspect of the present invention is to address at least the above-mentioned problems and/or disadvantages and to provide at least the advantages described below. Accordingly, an aspect of the present invention is to provide a handover method that supports terminal mobility, so as to reduce wasted signaling resources and wireless resources during the Selected IP Traffic Offload (SIPTO) and Local IP Access (LIPA) handover or to make the User Equipment (UE) use the optimal bearer as far as possible after the handover, so that the Quality of Service (QoS) is improved.

Another aspect of the present invention is to provide a handover method that supports terminal mobility, wherein during a handover from a source base station to a target base station by a UE, if the handover is performed as an S1 handover, where an S1 interface is an interface between the base station and a core network, the method including providing, by the target base station, access control determination information for a target core network node, and if the target core network node permits a bearer supporting a SIPTO or LIPA service to perform the handover according to the access control determination information, updating bearer information, or otherwise, notifying handover failure with respect to the bearer not allowed to perform the handover, or alternatively, during the handover to a target network by the UE or after the handover to the target network, performing bearer release or deactivation for the bearer not allowed to perform the handover.

Still another aspect of the present invention is to provide a handover method that supports terminal mobility, wherein during a handover from a source base station to a target base station by UE, if the handover is performed as an S1 interface handover, where an S1 interface is an interface between the base station and a core network, the method including providing, by a target core network node, access control determination information for the target base station, and, if the target base station permits a bearer supporting an SIPTO or LIPA service to perform the handover according to the access control determination information, notifying the target core network node to update bearer information, or otherwise, notifying handover failure to the target core network node with respect to the bearer not allowed to perform the handover, or alternatively, notifying the target core network node to, during the handover to a target network by the UE or after the handover to the target network, perform bearer release or deactivation for the bearer not allowed to perform the handover.

Yet another aspect of the present invention is to provide a handover method that supports terminal mobility, wherein during a handover from a source base station to a target base station by UE, if the handover is performed as an S1 interface handover, where an S1 interface is an interface between the base station and a core network, the method including requesting, by a source core network node, the target base station to provide access control determination information, providing, by the target base station, the access control determination information for the source core network node, and if the source core network node permits a bearer supporting an SIPTO or LIPA service to perform the handover according to the access control determination information, notifying a target core network node to update bearer information, or otherwise, notifying handover failure to the source base station with respect to the bearer not allowed to perform the handover, or alternatively, during the handover to a target network by the UE or after the handover to the target network, performing bearer release or deactivation for the bearer not allowed to perform the handover.

Still another aspect of the present invention is to provide a handover method that supports terminal mobility, wherein during a handover from a source base station to a target base station by UE, if the handover is performed as an X2 interface handover, where an X2 interface is an interface between the base stations, the method including providing, by the source base station, access control determination information for the target base station, and if the target base station permits a bearer supporting an SIPTO or LIPA service to perform the handover according to the access control determination information, notifying the core network node to update bearer information, or otherwise, notifying handover failure to the source base station with respect to the bearer not allowed to perform the handover, or alternatively, notifying the source base station to, during the handover to a target network by the UE or after the handover to the target network, perform bearer release or deactivation for the bearer not allowed to perform the handover.

Still yet another aspect of the present invention is to provide a handover method that supports terminal mobility, wherein during a handover from a source base station to a target base station by UE, if the handover is performed as an X2 interface handover, where an X2 interface is an interface between the base stations, the method including providing, by the target base station, access control determination information for a core network node, and if the core network node permits a bearer supporting an SIPTO or LIPA service to perform the handover according to the access control determination information, updating bearer information, or otherwise, notifying handover failure to the source base station with respect to the bearer not allowed to perform the handover, or alternatively, during the handover to a target network by the UE or after the handover to the target network, performing bearer release or deactivation for the bearer not allowed to perform the handover.

Yet still another aspect of the present invention is to provide a handover method that supports terminal mobility, wherein during location update by UE, the method including obtaining, by a core network node, access control determination information from another network node, and if it is determined by the core network node that the UE is still within an enterprise network, executing a subsequent location update process, or otherwise, performing bearer release or deactivation a bearer not allowed to perform the location update, wherein the bearer not allowed to perform the location update including the bearer supporting an SIPTO or LIPA service.

It can be seen from the above technical solutions that in the method provided by the present invention, before the target core network node updates the wireless bearer information according to the target base station to which the UE performs the handover, an access control determination procedure is added. That is, according to the access control determination information provided by the target base station, if it is determined that the bearer supporting the SIPTO or LIPA service is permitted to perform the handover, the target core network node updates the bearer information. If it is determined that the bearer supporting the SIPTO or LIPA service is not allowed to perform the handover, the handover failure is notified with respect to the bearer not allowed to perform the handover, and the bearer information is not updated, thus the wasted signaling resource and wireless resource are reduced. Alternatively, during the handover to the target network by the UE or after the handover to the target network, the bearer release or deactivation is performed for the bearer not allowed to perform the handover, so that the UE can re-initiate the bearer establishment process with respect to the bearer not allowed to perform the handover, thus an optimized bearer is established and the QoS is ensured.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
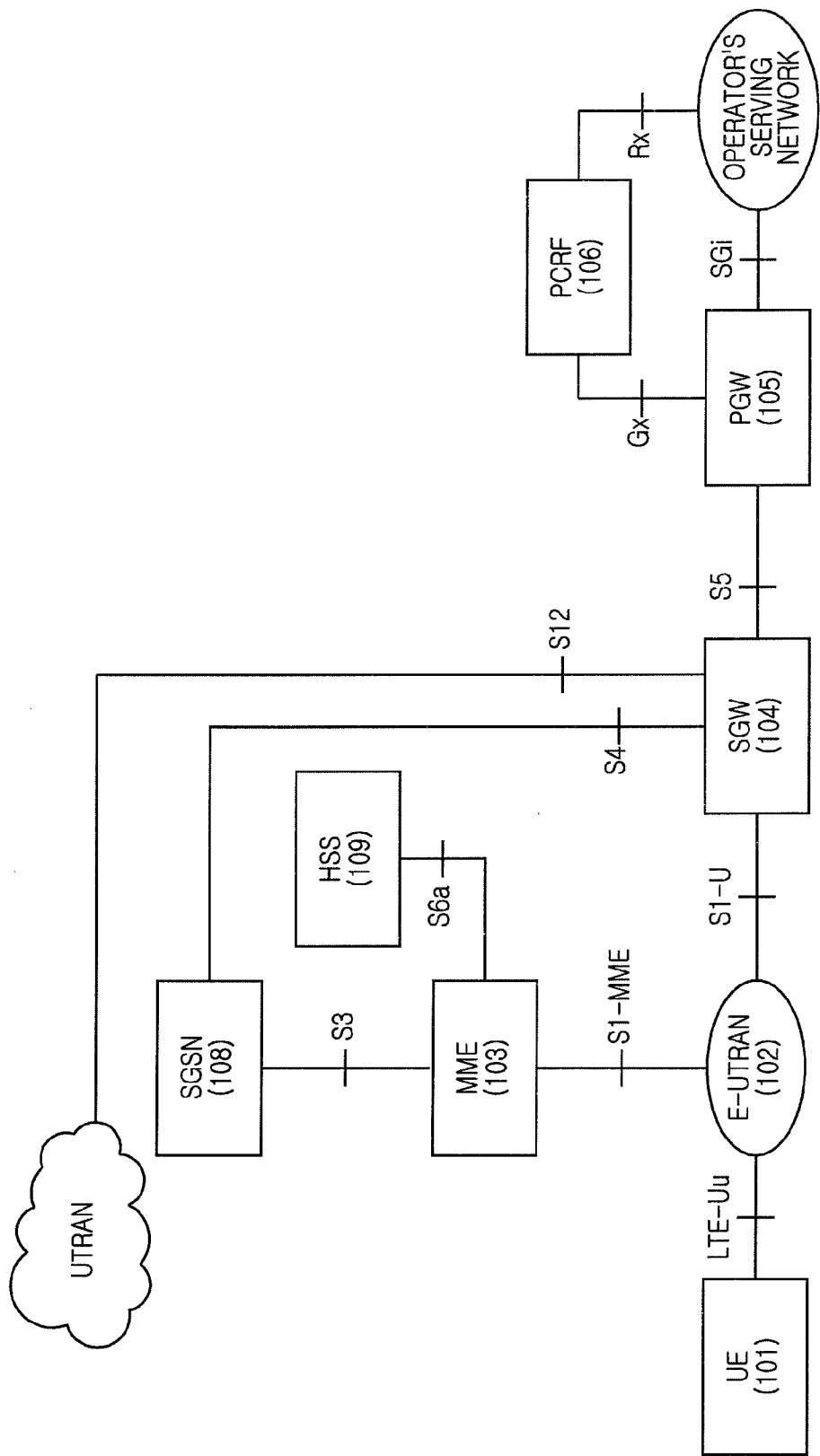
FIG. 1 is a diagram illustrating a System Architecture Evolution (SAE) system architecture according to the related art.
Figure 2:
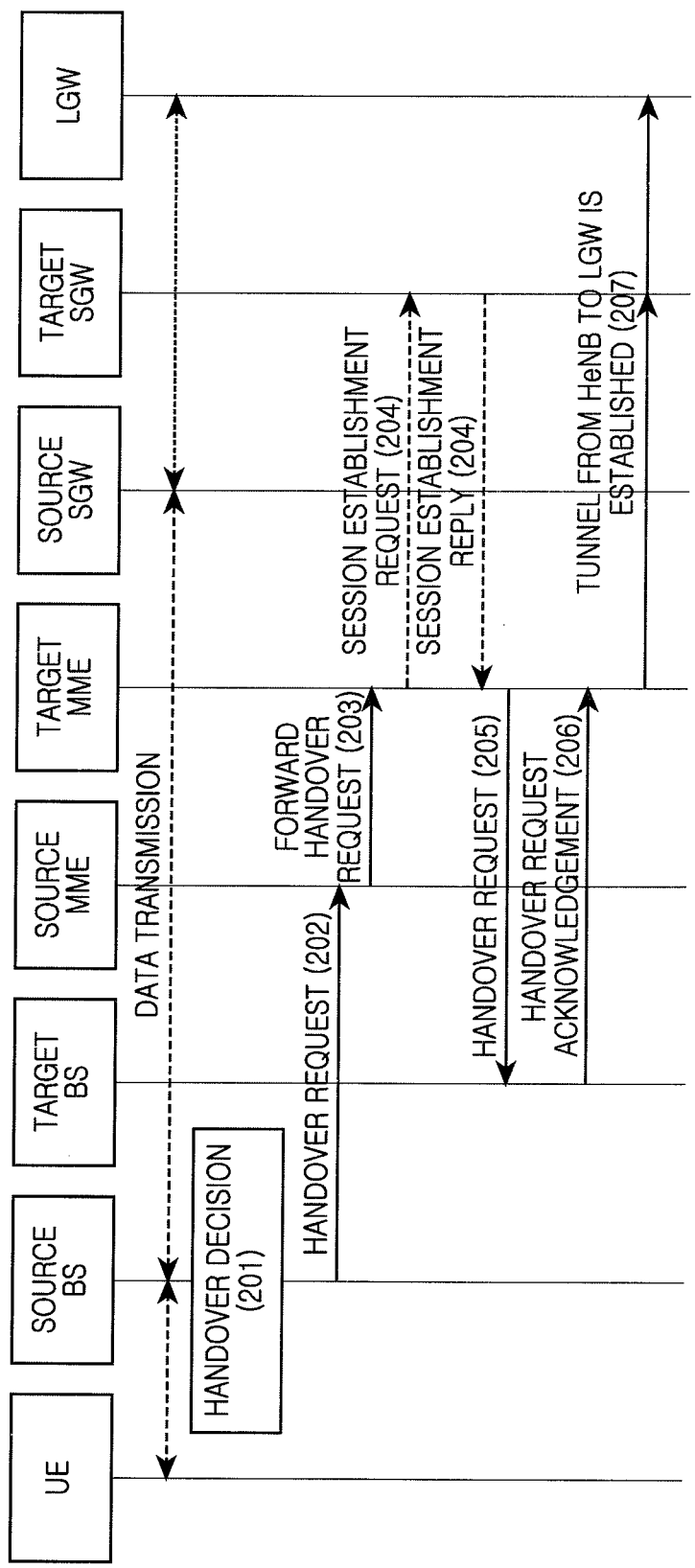
FIG. 2 is a flowchart illustrating a handover in an existing Selected Internet Protocol (IP) Traffic Offload (SIPTO) and Local IP Access (LIPA) system according to the related art.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In order to make the objects, technical solutions and advantages of the present invention more apparent, an exemplary embodiment of the present invention is described in further detail below in combination with the accompanying drawings and specific exemplary embodiments.

The method provided by an exemplary embodiment of the present invention can contain the following implementation methods.

1. A target base station provides access control determination information for a target core network node. If the target core network node permits a bearer supporting a Selected Internet Protocol (IP) Traffic Offload (SIPTO) or Local IP Access (LIPA) service to perform a handover according to the access control determination information, wireless bearer information is updated. Otherwise, handover failure is notified with respect to the bearer not allowed to perform the handover, or alternatively, during the handover to a target network by a User Equipment (UE) or after the handover to the target network, bearer release or deactivation is performed for the bearer not allowed to perform the handover.

2. The target core network node provides the access control determination information for the target base station. If the target base station permits the bearer supporting the SIPTO or LIPA service to perform the handover using the access control determination information, the target core network node is notified to update the wireless bearer information. Otherwise, the handover failure is notified to the target core network node with respect to the bearer not allowed to perform the handover, or alternatively, the target core network node is notified that during the handover to the target network by the UE or after the handover to the target network, the bearer release or deactivation is performed for the bearer not allowed to perform the handover.

3. A source core network node requests the target base station to provide the access control determination information, and the target base station provides the access control determination information for the source core network node. If the source core network node permits the bearer supporting the SIPTO or LIPA service to perform the handover using the access control determination information, the target core network node is notified to update the wireless bearer information. Otherwise, the handover failure is notified to a source base station with respect to the bearer not allowed to perform the handover, or alternatively, during the handover to the target network by the UE or after the handover to the target network, the bearer release or deactivation is performed for the bearer not allowed to perform the handover.

The three methods described above are used for the UE to have an S1 interface handover.

4. The source base station provides the access control determination information for the target base station. If the target base station permits the bearer supporting an SIPTO or LIPA service to perform the handover according to the access control determination information, the core network node is notified to update the wireless bearer information. Otherwise, the handover failure is notified to the source base station with respect to the bearer not allowed to perform the handover, or alternatively, the source base station is notified that during the handover to the target network by the UE or after the handover to the target network, the bearer release or deactivation is performed for the bearer not allowed to perform the handover.

5. The target base station provides the access control determination information for the core network node. If the core network node permits the bearer supporting the SIPTO or LIPA service to perform the handover according to the access control determination information, the wireless bearer information is updated. Otherwise, the handover failure is notified to the source base station with respect to the bearer not allowed to perform the handover, or alternatively, during the handover to the target network by the UE or after the handover to the target network, the bearer release or deactivation is performed for the bearer not allowed to perform the handover.

The fourth and the fifth methods are used for the UE to have an X2 interface handover.

6. The core network node obtains the access control determination information from another network node. If the core network node determines that the UE is still within an enterprise network, a subsequent location update process is executed. Otherwise, the bearer release or deactivation is performed for the bearer not allowed to perform a location update.

The sixth method is used for the UE to have the location update process.

The above-described bearer not allowed to perform the handover or not allowed to perform the location update may specifically include the bearer supporting the SIPTO or LIPA service.

In the manner described above, the access control determination information can be information of a user plane accessible to the target base station, or the information of the user plane currently accessed by the source base station, or information of a network where the base station that the UE belongs to is located, etc. To determine whether the bearer supporting the SIPTO or LIPA service is permitted to perform the handover is actually to determine whether service continuity can be maintained after the handover to the target base station. This can specifically be as follows. It is determined whether the UE can access a user-plane node currently accessed by the source base station through the target base station, and if yes, it is determined that the UE is permitted to perform the handover. Alternatively, when the UE is determined to perform an inter-network handover, it is determined whether a policy of an operator allows the UE to perform the inter-network handover, and if yes, it is determined that the UE is permitted to perform the handover. Alternatively, it is determined whether the UE has the inter-network handover, i.e. whether the UE is moved out of the enterprise network, and if no, it is determined that the bearer supporting the SIPTO or LIPA service is permitted to perform the handover, or if yes, it is determined that the bearer supporting the SIPTO or LIPA service is not permitted to perform the handover. Hereinbelow, the method provided by the present invention is described by way of eight embodiments.

First Exemplary Embodiment

Figure 3:
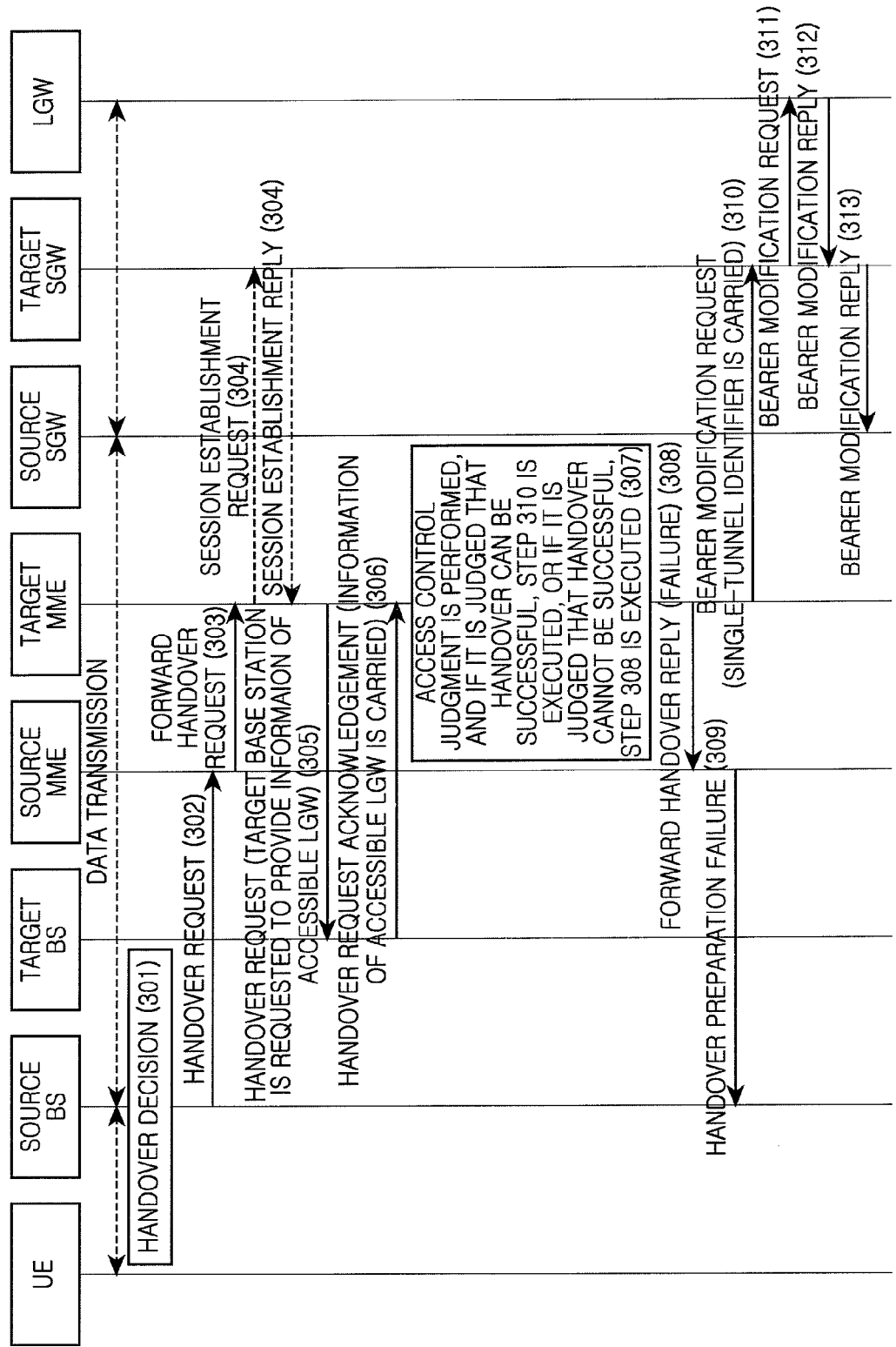
FIG. 3 is a flowchart illustrating a method according to a first exemplary embodiment of the present invention.

FIG. 3 is a flowchart illustrating a method according to a first exemplary embodiment of the present invention. Referring to FIG. 3, the method can include the following steps.

At step 301, the source base station decides to perform the handover.

At step 302, the source base station sends a handover request to a source Mobile Management Entity (MME). In the handover request, target base station information, e.g., a target base station identification (ID) and target Tracking Area ID (TAI), is included, and information such as a target CSG or a handover type and the like can also be included.

At step 303, the source MME sends a forward handover request to a target MME. The target base station information, e.g., an evolved Node B (eNB) ID that can differentiate whether the target base station is a Home enhance Node B (HeNB) or a macro base station, is included in the forward handover request. In addition, the information such as the target TAI, target Closed Subscriber Group (CSG) ID, and the like is also included in the message.

Further, the source MME can provide information of an Access Point Name (APN) accessed by the source base station for the target MME through the forward request. The APN can indicate information of a Local GateWay (LGW).

At step 304, if the target MME reselects a Serving GateWay (SGW) for the UE, a session establishment process is executed with the reselected target SGW.

If it is not required to reselect the SGW for the UE, there is no need to execute step 304.

In this step, according to the policy being set on the target MME, it can be decided whether the SGW is reselected for the UE. For example, assume there is a load balance policy. That is, the target MME determines whether a load of the current SGW exceeds a limit, and if yes, the SGW accessible to the target base station is reselected for the UE, or the MME selects the suitable SGW for the UE according to current location information of the UE. The method for deciding whether the reselection is performed in this step is described in the related art, and a repeated description thereof is omitted herein.

The above steps 301 to 304 correspond to steps 201 to 204 in the existing procedure of the related art.

At step 305, the target MME sends the handover request to the target base station. Instruction information for requesting the target base station to provide the information of the accessible LGW is included in the handover request.

In this step, an existing Information Element (IE) is extended or a new identifier is added in the handover request sent by the target MME to the target base station to instruct that the target base station is requested to provide the information of the accessible LGW.

The target MME knows that the currently accessed UE supports the SIPTO or the LIPA according to the information in the received forward handover request message. The target MME decides also to establish a direct tunnel in a target system, and the handover request message sent by the target MME can carry an address of the LGW and a tunnel identifier for uplink data transmission, e.g., a tunnel ID of the LGW. The target base station establishes an uplink data transmission tunnel according to the information.

At step 306, the target base station has the information of the LGW accessible to the target base station carried in a handover request determination message to reply to the target MME.

Specifically, the information of the LGW accessible to the target base station can be an identifier of the accessible LGW, an IP address of the LGW or domain name information of the LGW, etc.

When the LGW and the SGW are implemented on the same physical entity, the information of the accessible LGW is actually the information of the accessible LGW and SGW.

At step 307, the target MME performs an access control determination using the information of the LGW accessible to the target base station and the information of the LGW currently accessed by the source base station, i.e., determines whether the target base station can access the LGW currently accessed by the source base station, and if yes, it is determined that the handover can be successful and step 310 is executed, or otherwise, it is determined that the handover cannot be successful and step 308 is executed.

During the handover, the continuity of a service stream can be ensured only if the target base station and the source base station access the same LGW. Therefore in this embodiment, before the tunnel between the target base station and the LGW is established, the target MME first performs the access control determination to determine whether the handover can be successful in advance, and if yes, the tunnel between the target base station and the LGW is established, or otherwise, there is no need to establish the tunnel between the target base station and the LGW, thus a wireless resource and signaling resource are saved.

In addition, when it is determined that the target base station can access the LGW currently accessed by the source base station, it can be further determined whether the policy of the operator allows performing the inter-network handover if the UE performs the inter-network handover. For example, it is further determined whether the policy of the operator allows that the UE can access the service inside the enterprise network even if being moved to the outside of the enterprise network. If yes, step 310 is executed, or otherwise, step 308 is executed.

If it is determined that the UE performs the handover inside the enterprise network according to the information of the LGW accessible to the target base station and the information of the LGW currently accessed by the source base station, it can be determined that the bearer supporting the SIPTO or LIPA service is allowed to perform the handover. If it is determined that the UE is moved out of the enterprise network, it can be determined that the bearer supporting the SIPTO or LIPA service is not allowed to perform the handover. Of course, another access control determination policy can also be adopted, which is the case for the following embodiments, and the repeated description thereof is omitted.

At step 308, the target MME sends handover failure information to the source MME through a forward handover reply.

At step 309, the source MME replies to the source base station with a handover preparation failure message, and ends the current handover procedure.

At step 310, the target MME sends a bearer modification request to the target SGW. The target base station information and a single-tunnel identifier are contained in the bearer modification request.

If step 304 is executed, i.e., the reselection of the SGW is performed, the target SGW at step 310 is the reselected SGW. Otherwise, the SGW at step 310 is a source SGW.

The established tunnel between the target base station and the LGW is a dual tunnel, i.e. the tunnel between the target base station and the target SGW is established first, then the tunnel between the target SGW and the LGW is established, thus the tunnel between the target base station and the LGW is constructed. In this embodiment, a preferred single-tunnel establishment manner is provided. In this step, a new identifier, i.e. the single-tunnel identifier, is added in the bearer modification request, so that after the target SGW receives the bearer modification request, there is no need to establish the tunnel between the target base station and the target SGW, instead the LGW is directly notified to establish the tunnel with the target base station.

At step 311, the target SGW forwards the target base station information to the LGW through the bearer modification request.

At step 312, using the target base station information in the bearer modification request, the LGW starts to directly establish the tunnel with the target base station, and sends a bearer modification reply to the target SGW.

At step 313, the target SGW forwards the bearer modification reply to the target MME, and the target MME forwards the same to the target base station.

Steps 310 to 313 are a process of establishing the tunnel between the target base station and the LGW. The single-tunnel establishment manner in this exemplary embodiment can be adopted, and a dual-tunnel establishment manner in the prior art can also be adopted.

Heretofore, the procedure of the first exemplary embodiment is ended.

Second Exemplary Embodiment

Figure 4:
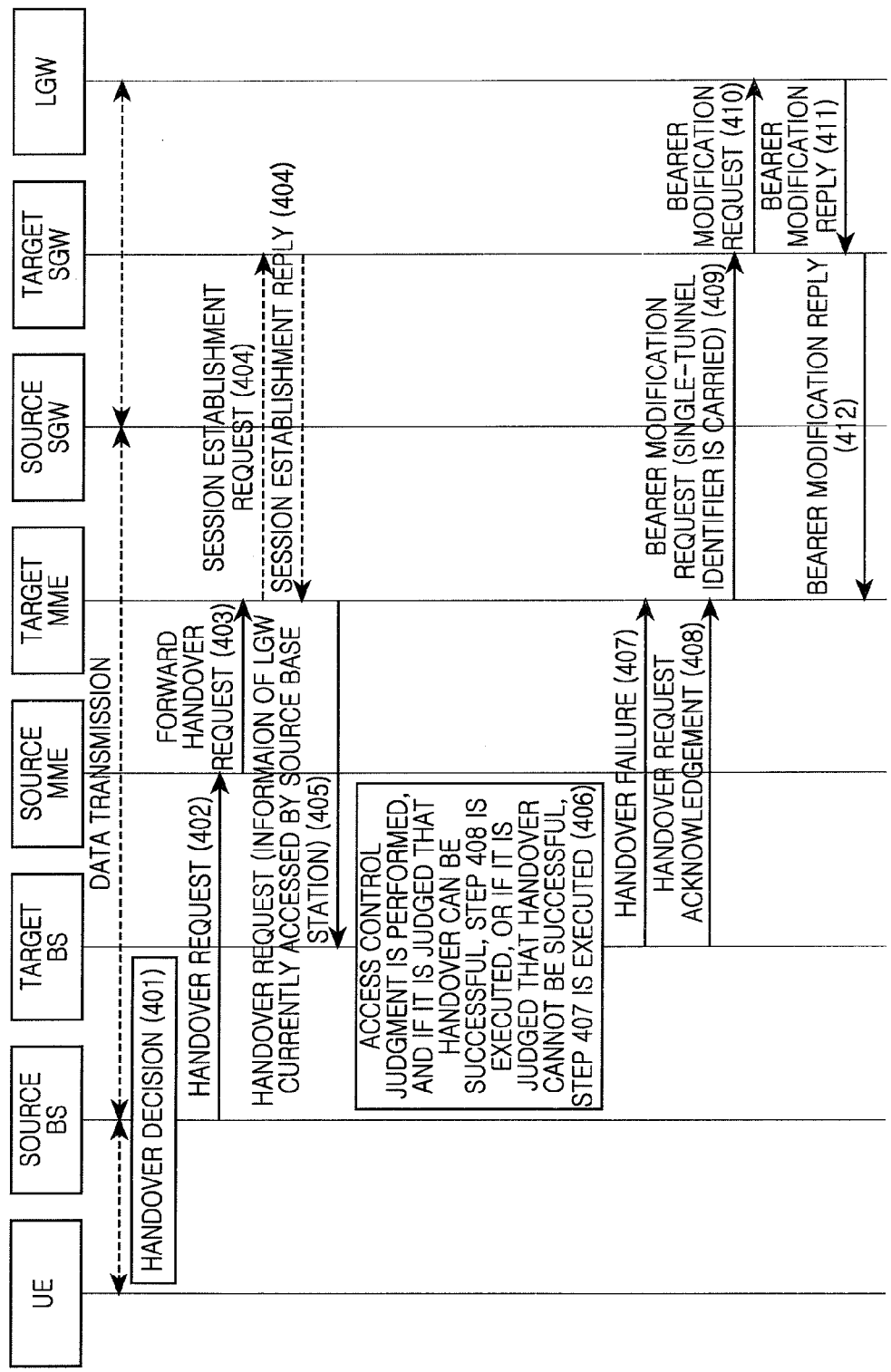
FIG. 4 is a flowchart illustrating a method according to a second exemplary embodiment of the present invention.

FIG. 4 is a flowchart illustrating the method according to a second exemplary embodiment of the present invention. Referring to FIG. 4, the method can include the following steps.

Steps 401 to 404 are the same as steps 301 to 304 in the first exemplary embodiment, and a repeated description thereof is omitted herein.

At step 405, the target MME sends the handover request to the target base station. The information of the LGW currently accessed by the source base station is included in the handover request.

Specifically, the information of the LGW currently accessed by the source base station can be the identifier of the currently accessed LGW, the IP address of the LGW or the domain name information of the LGW, etc.

The target MME knows that the currently accessed UE supports the SIPTO or the LIPA according to the information in the received forward handover request message. The target MME decides also to establish the direct tunnel in the target system, and the handover request message sent by the target MME carries the address of the LGW and the tunnel identifier for uplink data transmission, e.g. the tunnel ID of the LGW. The target base station establishes the uplink data transmission tunnel according to the information.

At step 406, the target MME performs the access control determination using the information of the LGW accessible to the target base station and the information of the LGW currently accessed by the source base station, i.e. determines whether the target base station can access the LGW currently accessed by the source base station, and if yes, it is determined that the handover can be successful and step 408 is executed, or otherwise, it is determined that the handover cannot be successful and step 407 is executed.

Likewise, during the handover, the continuity of the service stream can be ensured only if the target base station and the source base station access the same LGW. Therefore, in this embodiment, before the tunnel between the target base station and the LGW is established, the target MME first performs the access control determination to determine whether the handover can be successful in advance, and if yes, the tunnel between the target base station and the LGW is established, or otherwise, there is no need to establish the tunnel between the target base station and the LGW, thus the wireless resource and signaling resource are saved.

In addition, when it is determined that the target base station can access the LGW currently accessed by the source base station, it can be further determined whether the policy of the operator allows performing the inter-network handover if the UE performs the inter-network handover. For example, it is further determined whether the policy of the operator allows that the UE can access the service inside the enterprise network even if being moved to the outside of the enterprise network. If yes, step 408 is executed, or otherwise, step 407 is executed.

At step 407, the target MME sends the handover failure information to the target MME, and ends the procedure.

At step 408, the target base station sends a handover request acknowledgement message to the target MME.

The single-tunnel identifier can be carried in the handover request acknowledgement message, to instruct the target MME to initiate a user-plane single-tunnel establishment process.

At step 409, the target MME sends the bearer modification request to the target SGW. The target base station information and the single-tunnel identifier are included in the bearer modification request.

Steps 409 to 412 are the same as Steps 310 to 313 in the first embodiment, and a repeated description thereof is omitted herein. The dual-tunnel establishment manner in the prior art can also be adopted likewise.

Heretofore, the procedure of the second exemplary embodiment is ended.

Third Exemplary Embodiment

Figure 5:
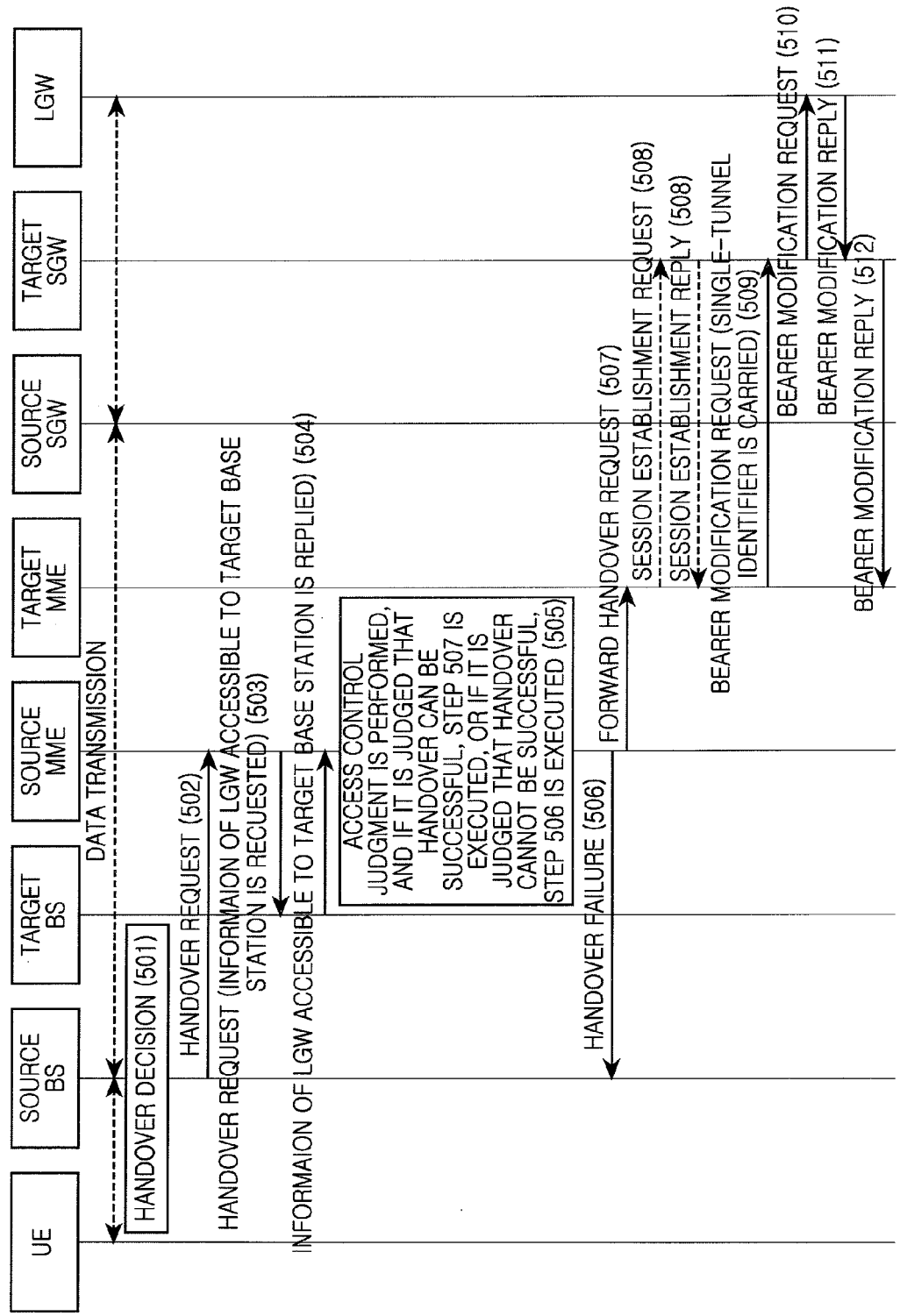
FIG. 5 is a flowchart illustrating a method according to a third exemplary embodiment of the present invention.

FIG. 5 is a flow chart illustrating the method according to a third exemplary embodiment of the present invention. Referring to FIG. 5, the method can include the following steps.

Steps 501 to 502 are the same as Steps 301 to 302 in the first embodiment, and a repeated description thereof is omitted herein.

At step 503, the source MME requests the target base station to provide the information of the LGW accessible to the target base station according to the target base station information in the handover request.

A new S1 interface Application Protocol (S1-AP) message is added to request the information of the LGW accessible to the target base station.

At step 504, the target base station replies to the source MME with the information of the LGW accessible to the target base station.

Likewise, a new S1-AP message can also be added in this step to request the information of the LGW accessible to the target base station.

Specifically, the information of the LGW accessible to the target base station can be the identifier of the accessible LGW, the IP address of the LGW or the domain name information of the LGW, etc.

At step 505, the source MME performs the access control determination using the information of the LGW accessible to the target base station and the information of the LGW currently accessed by the source base station, i.e., determines whether the UE can access the LGW currently accessed by the source base station through the target base station, and if yes, it is determined that the handover can be successful and step 507 is executed, or otherwise, it is determined that the handover cannot be successful and step 506 is executed.

In this exemplary embodiment, before the tunnel between the target base station and the LGW is established, the source MME first performs the access control determination to determine whether the handover can be successful in advance, and if yes, the tunnel between the target base station and the LGW is established, or otherwise, there is no need to establish the tunnel between the target base station and the LGW, thus the wireless resource and signaling resource are saved.

In addition, when it is determined that the target base station can access the LGW currently accessed by the source base station, it can be further determined whether the policy of the operator allows performing the inter-network handover if the UE performs the inter-network handover. For example, it is further determined whether the policy of the operator allows that the UE can access the service inside the enterprise network even if being moved to the outside of the enterprise network. If yes, step 507 is executed, or otherwise, step 506 is executed.

At step 506, the source MME replies to the source base station with the handover failure information, and ends the procedure.

At step 507, the source MME sends the forward handover request to a target MME. The single-tunnel identifier can be included in the forward handover request.

The steps after step 507 until the step that the handover is ended are the same as 310 to 313 in the first exemplary embodiment, and a repeated description thereof is omitted herein. The description of 305 and 306 in the first exemplary embodiment is omitted between Steps 507 and 508. However, they are not skipped in execution.

At step 508, if the target MME reselects the SGW for the UE, the session establishment process is executed with the reselected target SGW.

If it is not required to reselect the SGW for the UE, there is no need to execute step 508.

Steps 509 to 512 are the same as steps 310 to 313 in the first exemplary embodiment. In addition, the dual-tunnel establishment manner of the related art can also be adopted likewise.

Heretofore, the procedure of the third exemplary embodiment is ended.

Figure 6:
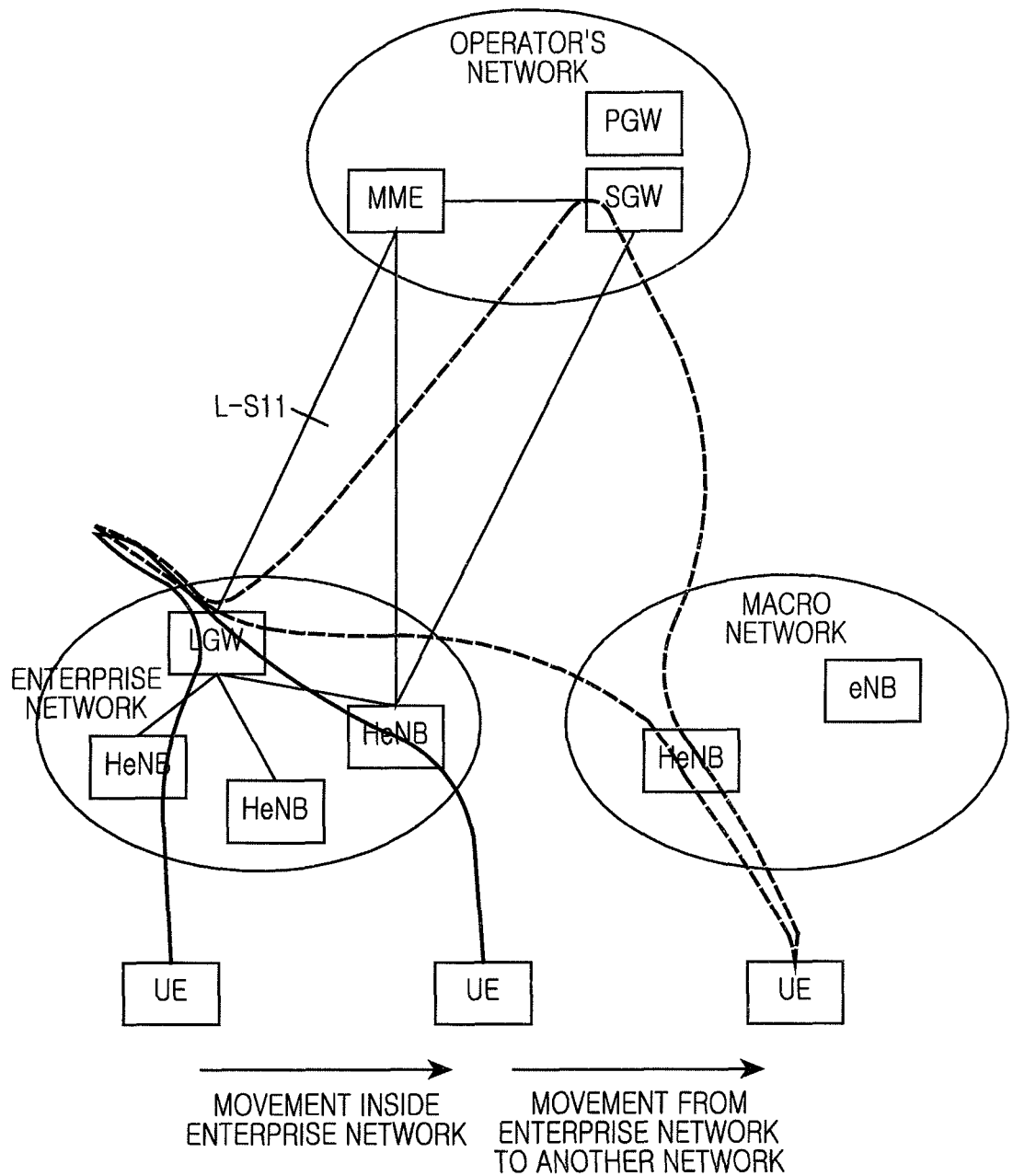
FIG. 6 is a schematic diagram illustrating a movement scenario applicable to exemplary embodiments of the present invention.

Referring now to FIG. 6, the base station involved in the exemplary embodiments described above can be the HeNB or the macro base station, and can be applicable to the handover inside the network allowing a particular user to have the access, and can also be applicable to the handover from the network allowing the particular user to have the access to another network. Specifically, the network allowing the particular user to have the access includes the enterprise network, a home network, etc. As shown in FIG. 6, a solid line in the figure shows a path handover process when the UE is moved inside the enterprise network. When the UE is moved from the enterprise network to another network, the path becomes one of two dotted lines in the figure.

It should be explained that the description of the exemplary embodiments described above takes an SAE system as an example for description, but the method provided by the present invention is also applicable to a Universal Mobile Telecommunication System (UMTS). In the UMTS system, an HNB is adopted for the base station, the MME is replaced by a Serving General Packet Radio Service (GPRS) Support Node (SGSN), and the LGW is replaced by a Gateway GPRS Support Node (GGSN).

Fourth Exemplary Embodiment

Figure 7:
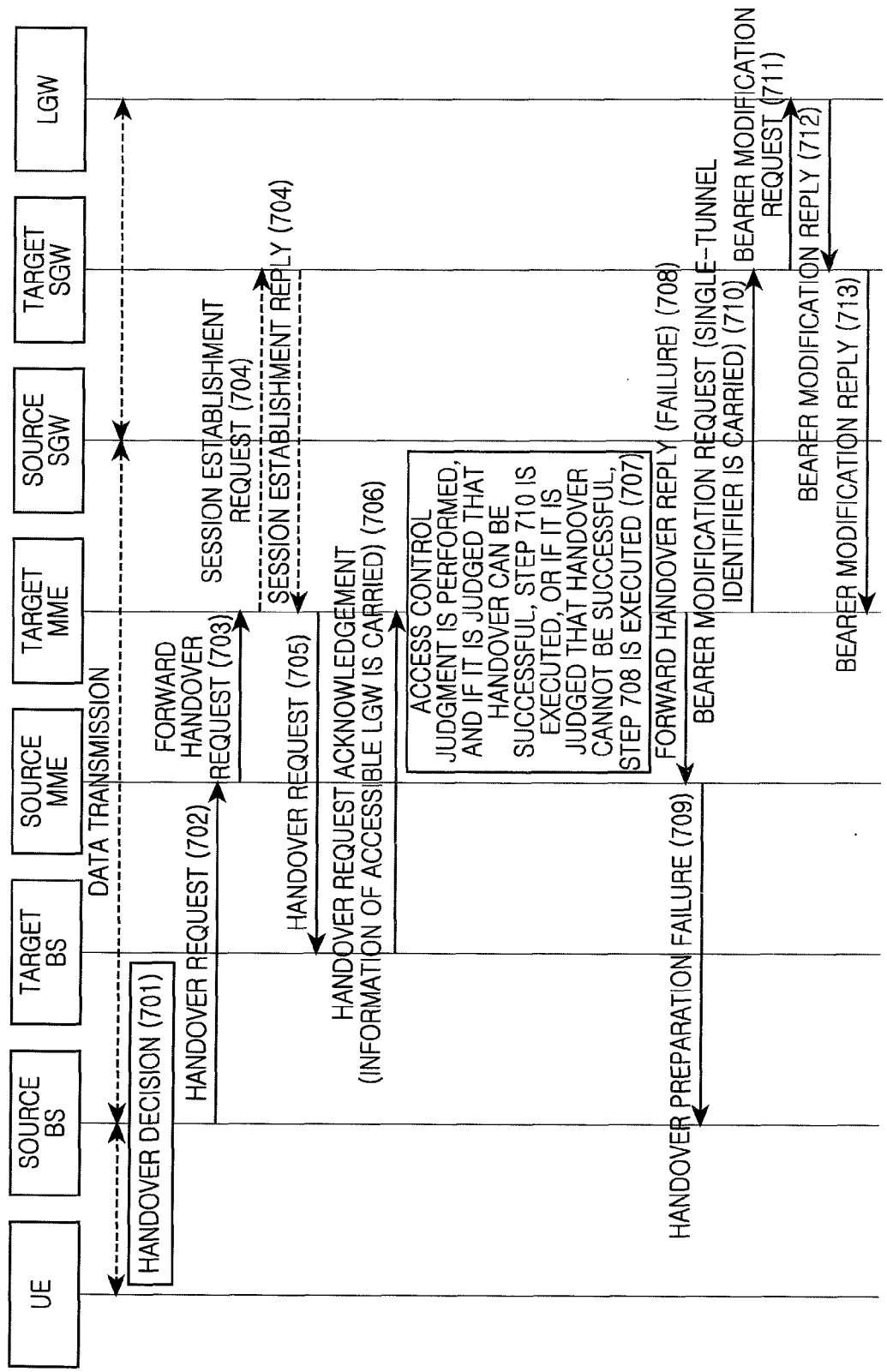
FIG. 7 is a flowchart illustrating a method according to a fourth exemplary embodiment of the present invention.

FIG. 7 is a flowchart illustrating the method according to a fourth exemplary embodiment of the present invention. Referring to FIG. 7, the method can include the following steps.

Steps 701 to 704 are the same as Steps 301 to 304 in the first embodiment, and the repeated description thereof is omitted herein.

At step 705, the target MME sends the handover request to the target base station.

In this step, being different from the first exemplary embodiment, the target MME sends an ordinary handover request to the target base station.

At step 706, the target base station has the information of the LGW accessible to the target base station carried in the handover request acknowledgement message to reply to the target MME.

In this exemplary embodiment, the target base station supporting the SIPTO or LIPA function is configured with a function for providing the access control determination information on its own initiative. That is, even if not receiving a request for the access control determination information, the target base station can, on its own initiative, provides the access control determination information for the target MME, i.e., sends the information of the user-plane node such as the information of the SGW or the information of the LGW accessible to the target base station and the like to the target MME.

In addition to the access control determination information providing manner described in this exemplary embodiment, the target base station can also provide the access control determination information for the target MME through another message, e.g., a newly defined message.

In this step, the information of the LGW accessible to the target base station can be the domain name information, the IP address or the identifier of the accessible LGW, or identifier information of the network currently accessed by the UE.

At step 707, the target MME performs the access control determination using the information of the LGW accessible to the target base station and the information of the LGW currently accessed by the source base station, i.e., determines whether the target base station can access the LGW currently accessed by the source base station, and if yes, it is determined that the handover can be successful and step 710 is executed, or otherwise, it is determined that the handover cannot be successful and step 708 is executed.

In addition to the access control manner described in this step, the target MME can also determine whether the UE is moved out of the enterprise network, i.e. whether the UE has performed the inter-network handover, according to the information of the LGW accessible to the target base station. If the UE has performed the inter-network handover, it can be determined whether the policy of the operator allows that the UE can access the service inside the enterprise network even if being moved to the outside of the enterprise network. If yes, step 710 is executed, or otherwise, step 708 is executed.

Steps 708 to 713 are the same as steps 308 to 313, and the repeated description thereof is omitted herein.

In this exemplary embodiment and the above-described first and fourth exemplary embodiments, the target MME executes the access control determination. When it is determined that the UE has performed the inter-network handover which leads to a determination result that performing the handover is not allowed, such a processing manner that the target MME directly sends a handover failure notification is typically applied to a circumstance that there is only a connection supporting the SIPTO or LIPA service. In addition to such a manner, the following processing manners can also be feasible.

If there is another service connection in addition to the connection supporting the SIPTO or LIPA service, another service connection can also perform the handover to the target network. The target MME can record a bearer list corresponding to the connection supporting the SIPTO or LIPA service. The bearer list is actually the list of bearers not allowing the handover. Here the bearer not allowing the handover typically is the bearer that may fail to perform the handover or is the bearer that does not perform an optimal handover. In this way, the target MME recording the bearer list can trigger a bearer release process for every bearer in the bearer list during the handover or after the handover, and can also trigger a deactivation process for every bearer in the bearer list after the handover. In this way, it can be achieved that when the inter-network handover is performed, the bearer supporting the SIPTO or LIPA service is released timely, and the UE can re-initiate a bearer establishment process with respect to these services after such bearers are released, thus an optimal bearer is established.

Corresponding to all exemplary embodiments of this application, after the UE is moved out of the enterprise network in the case that the UE has multiple Packet Data Node (PDN) connections, if the MME executes the access control determination, the MME recodes a partial bearer failure list in the event of immediately making the LIPA connection failed according to the determination result. A reason for the failure is that the target network does not support the LIPA. The MME triggers the bearer release process in a subsequent process following the handover, where the bearer failed due to an LIPA or SIPTO reason may be included, rather than immediately replying with the handover failure message. When an X2 handover occurs, the MME may also execute the same action.

Heretofore, the procedure of the fourth exemplary embodiment is ended.

The exemplary embodiments described above take the handover that occurs on an S1 interface as an example for description. The method provided by the present invention can also be applied to the handover that occurs on an X2 interface. Specifically, the S1 interface is the interface between the base station and a core network, and the X2 is the interface between the base stations. Below, such a situation is described by way of a fifth exemplary embodiment and a sixth exemplary embodiment.

Fifth Exemplary Embodiment

Figure 8:
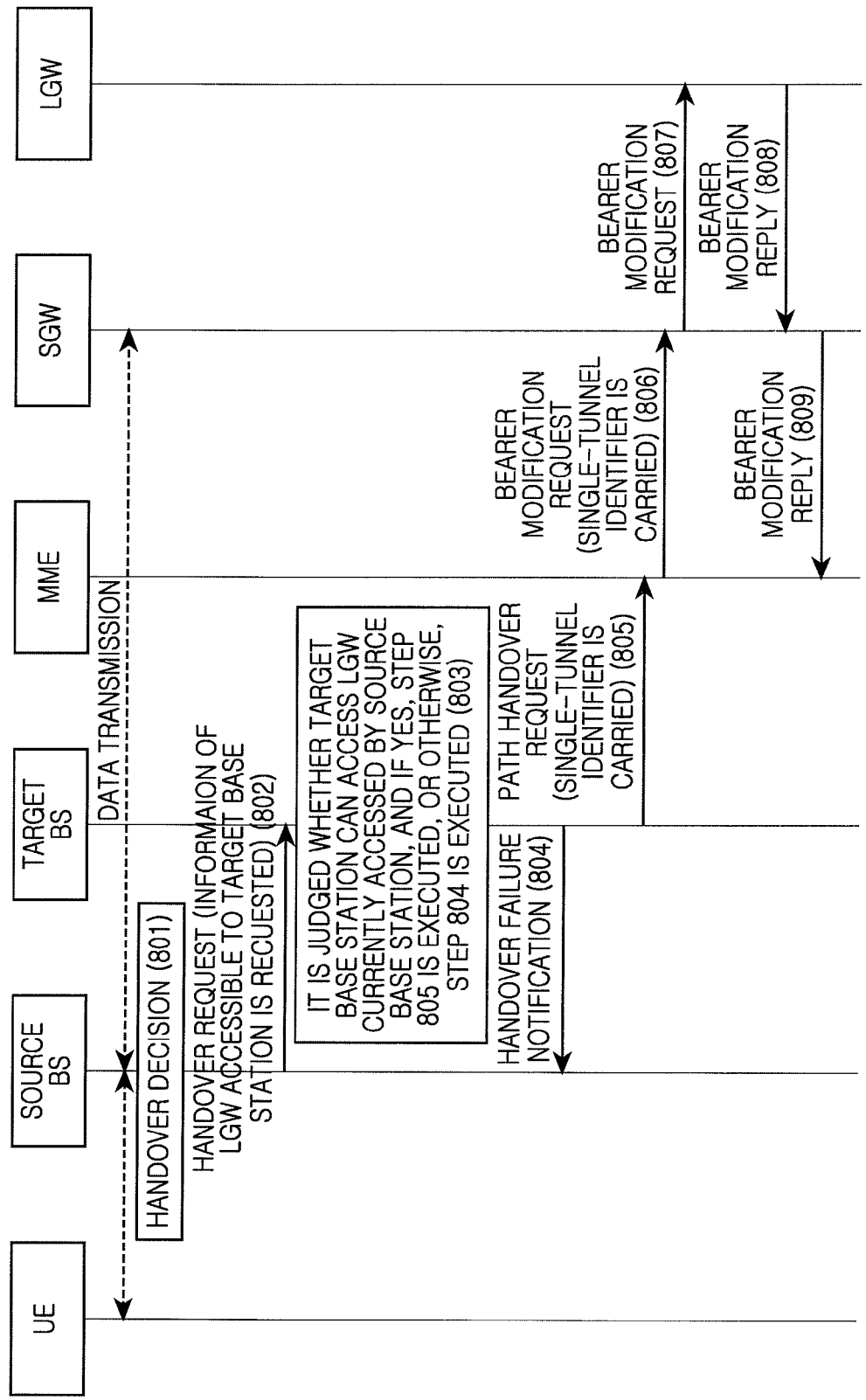
FIG. 8 is a flowchart illustrating a method according to a fifth exemplary embodiment of the present invention.

FIG. 8 is a flow chart illustrating the method according to a fifth exemplary embodiment of the present invention. Referring to FIG. 8, the method can include the following steps.

At step 801, by a measurement process, the source base station determines that the UE has the handover between the base stations.

At step 802, the source base station sends the handover request message to the target base station. The information of the LGW accessed by the source base station is carried in the handover request message.

In this step, the source base station can have the information of the user-plane node such as the information of the SGW or the information of the LGW accessed by it and the like carried in the handover request message as the access control determination information to send the same to the target base station. Specifically, the information of the user-plane node can include domain name information, an IP address or an identifier of the accessible user-plane node, etc.

At step 803, the target base station performs the access control determination according to the information of the accessed user-plane node that is provided by the source base station, i.e., determines whether the target base station can access the LGW currently accessed by the source base station, and if yes, it is determined that the handover can be successful and step 805 is executed, or otherwise, it is determined that the handover cannot be successful and step 804 is executed.

In addition to the access control manner described in this step, the target base station can also determine whether the UE is moved out of the enterprise network, i.e., whether the UE has performed the inter-network handover, according to the information of the LGW accessible to the target base station and the information of the LGW accessed by the source base station. If the UE has performed the inter-network handover, it can be determined whether the policy of the operator allows that the UE can access the service inside the enterprise network even if being moved to the outside of the enterprise network. If yes, step 805 is executed, or otherwise, step 804 is executed.

At step 804, the target base station sends the handover failure information to the source base station through a handover request reply message, and ends the procedure.

In this exemplary embodiment and in the second exemplary embodiment, the target base station performs the access control determination. In this situation, if the access control determination results in that it is determined that the user performs the inter-network handover, i.e., has performed the handover to the outside of the enterprise network, such a processing manner that the target base station directly sends the handover failure notification is typically applied to the circumstance that there is only the connection supporting the SIPTO or LIPA service. In addition to such a manner, the following processing manners can also be feasible.

If there is another service connection in addition to the connection supporting the SIPTO or LIPA service, another service connection can also perform the handover to the target base station. The target base station can reply to the source base station in this embodiment or to the target MME in the second exemplary embodiment with the bearer list corresponding to the connection supporting the SIPTO or LIPA service. The bearer list is actually the list of bearers not allowing the handover. Here the bearer not allowing the handover typically is the bearer that may fail to perform the handover or is the bearer that does not perform the optimal handover. In this way, the source base station or the target MME obtaining the bearer list can trigger the bearer release process for every bearer in the bearer list during the handover or after the handover, and can also trigger the deactivation process for every bearer in the bearer list after the handover. In this way, it can be achieved that when the inter-network handover is performed, the bearer supporting the SIPTO or LIPA service is released timely, and the UE can re-initiate the bearer establishment process with respect to these services after such bearers are released, thus the optimal bearer is established.

At step 805, the target base station sends a path handover request carrying the single-tunnel identifier to the MME, so as to notify the MME to establish the direct tunnel.

At step 806, the MME sends the bearer modification request to the SGW currently accessed by the base station. The base station information and the single-tunnel identifier are included in the bearer modification request.

At step 807, the SGW currently accessed by the base station forwards the base station information to the LGW through the bearer modification request.

At step 808, using the base station information in the bearer modification request, the LGW starts to directly establish the tunnel with the target base station, and sends the bearer modification reply to the SGW currently accessed by the base station.

At step 809, the SGW currently accessed by the base station forwards the bearer modification reply to the MME, and the MME forwards the same to the base station.

Steps 805 to 809 described above are a process of directly establishing the tunnel between the base station currently accessed by the UE and the LGW, which is similar to steps 310 to 313 in the first exemplary embodiment. The single-tunnel establishment manner in this exemplary embodiment can be adopted, and the dual-tunnel establishment manner of the related art can also be adopted.

Heretofore, the procedure of the fifth exemplary embodiment is ended.

Sixth Exemplary Embodiment

Figure 9:
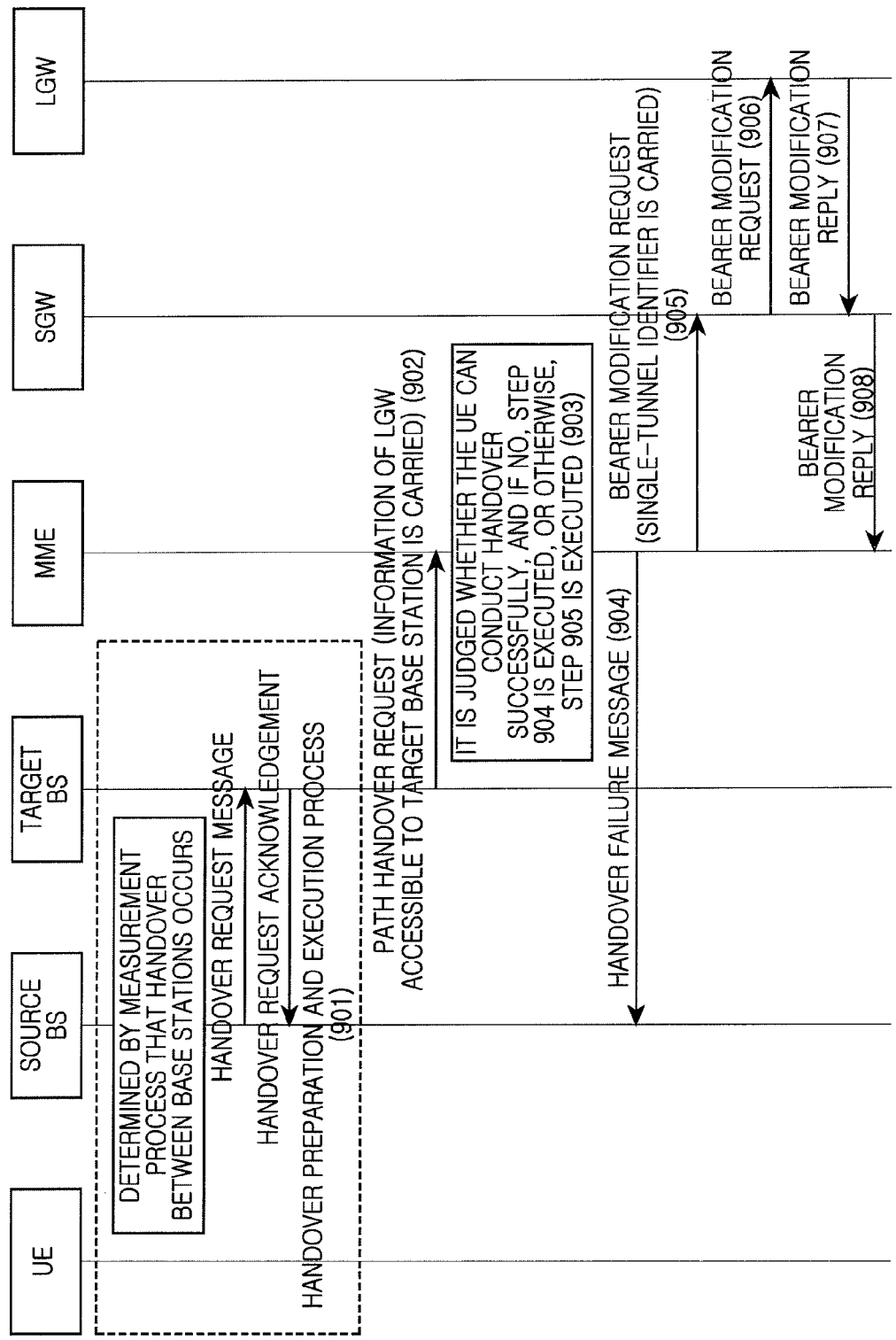
FIG. 9 is a flowchart illustrating a method according to a sixth exemplary embodiment of the present invention.

FIG. 9 is a flowchart illustrating the method according to a sixth exemplary embodiment of the present invention. Referring to FIG. 9, the method includes the following steps.

At step 901, a handover preparation and execution process is performed.

It can be included in this step that the source base station determines that the UE has the handover between the base stations by the measurement process, the source base station sends the handover request message to the target base station, and the target base station replies to the source base station with the handover request acknowledgement message.

At step 902, the target base station sends the path handover request message to the MME. The information of the LGW accessible to the target base station is included in the message.

In this step, the target base station can send information of the target network or the information of the user-plane node accessible to the target base station to the MME as the access control determination information. Specifically, the user-plane node can be the LGW or the SGW. The information of the user-plane node can include the domain name information, the IP address or the identifier of the accessible user-plane node, etc.

At step 903, the MME determines whether the UE can perform the handover successfully according to the information of the LGW accessed by the source base station and the received information of the LGW accessible to the target base station, and if not, step 904 is executed, or otherwise, step 905 is executed.

The MME itself knows the information of a source network or the information of the user-plane node accessed by the source base station, and performs the access control determination using the access control determination information provided by the target base station, to determine whether the UE can perform the handover successfully. This can specifically be as follows. It is determined whether the target base station can access the user-plane node accessed by the source base station, or it is determined whether the UE is moved out of the enterprise network. If the target base station can access the user-plane node accessed by the source base station, step 905 is executed. Otherwise, step 904 is executed. Alternatively, if the target base station is moved out of the enterprise network, step 904 is executed. If it is still within the enterprise network, step 905 is executed.

At step 904, the MME replies to the source base station with the handover failure message, and ends the current handover procedure.

Likewise, in this exemplary embodiment, when the UE has performed the inter-network handover which leads to the determination result that performing the handover is not allowed, such a processing manner that the target MME directly sends the handover failure notification is typically applied to the circumstance that there is only the connection supporting the SIPTO or LIPA service. In addition to such a manner, the following processing manners can also be feasible.

If there is another service connection in addition to the connection supporting the SIPTO or LIPA service, another service connection can also perform the handover to the target network. The MME can record the bearer list corresponding to the connection supporting the SIPTO or LIPA service. The bearer list is actually the list of bearers not allowing the handover. Here the bearer not allowing the handover typically is the bearer that may fail to perform the handover or is the bearer that does not perform the optimal handover. In this way, the MME recording the bearer list can trigger the bearer release process for every bearer in the bearer list during the handover or after the handover, and can also trigger the deactivation process for every bearer in the bearer list after the handover. In this way, it can be achieved that when the inter-network handover is performed, the bearer supporting the SIPTO or LIPA service is released timely, and the UE can re-initiate the bearer establishment process with respect to these services after such bearers are released, thus the optimal bearer is established.

Steps 905 to 908 are the same as steps 806 to 809 in the fifth exemplary embodiment, and the repeated description thereof is omitted herein.

Heretofore, the procedure of the sixth exemplary embodiment is ended.

In addition to the handover process described above, the method provided by the present invention can also be applied to the location update or another NAS process. Hereinbelow, such a situation is described by way of a seventh exemplary embodiment and an eighth exemplary embodiment.

Seventh Exemplary Embodiment

Figure 10:
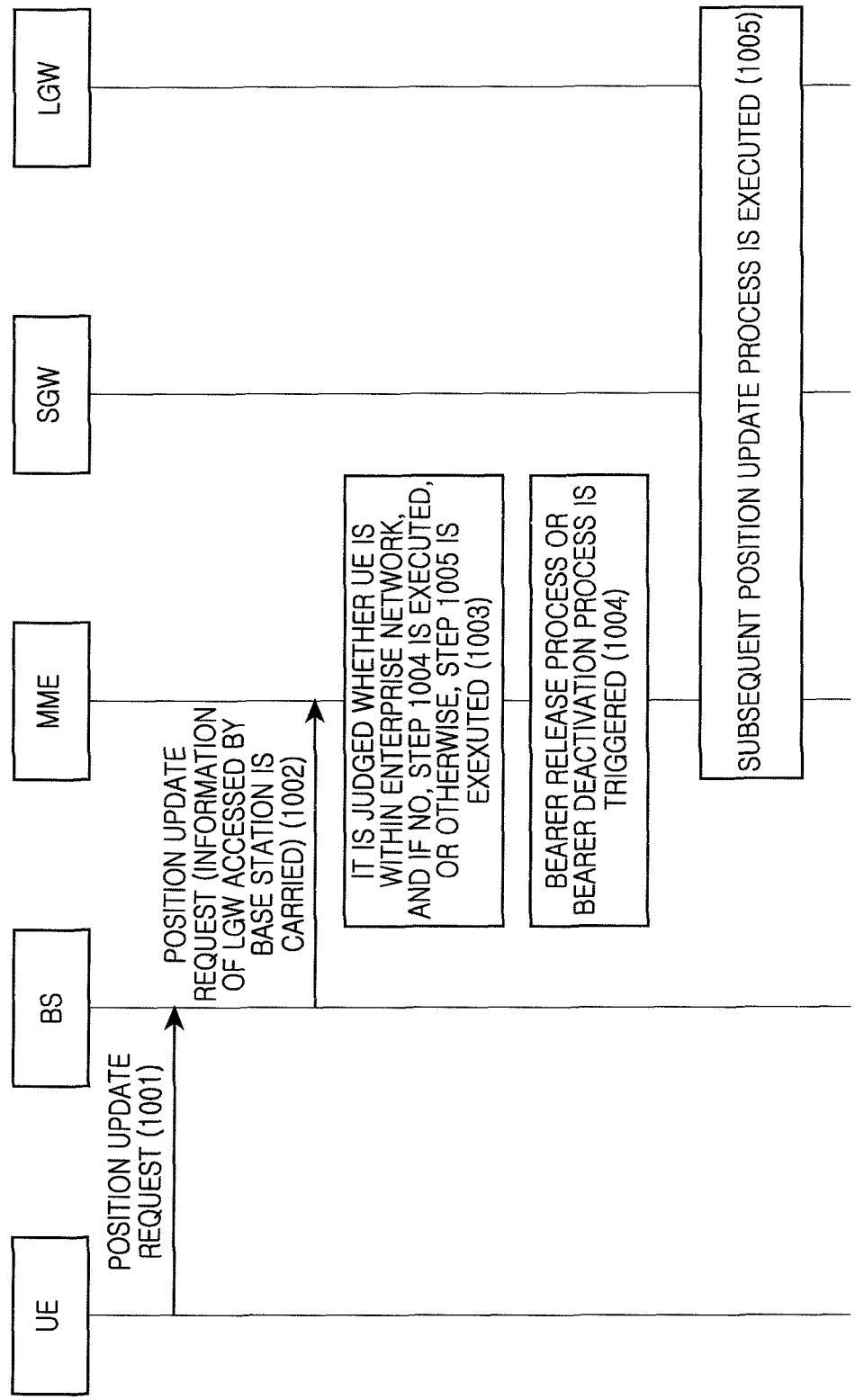
FIG. 10 is a flowchart illustrating a method according to a seventh exemplary embodiment of the present invention.

FIG. 10 is a flowchart illustrating the method according to a seventh exemplary embodiment of the present invention. Referring to FIG. 10, the method can include the following steps.

At step 1001, the UE sends a location update request to the MME through the currently accessed base station.

In this step, when performing the location update, the UE may send the location update request to the currently belonged-to MME through the base station. If performing another Network Access Server (NAS) service, the UE sends another NAS request to the currently belonged-to MME through the base station.

At step 1002, the base station sends the information of the LGW currently accessed by the base station to the MME through an S1 message.

In this step, after receiving the location update request, the base station can carry the access control determination information, i.e., the information of the user-plane node (e.g., the information of the SGW or the LGW) accessible to the base station, through the location update request sent to the MME. Specifically, the information of the user-plane node can be the domain name information, the IP address or the identifier of the user-plane node accessible to the base station, etc. In addition, the access control determination information can also be sent to the MME through another S1 message.

At step 1003, the MME determines whether the UE is within the enterprise network according to the information of the currently accessed LGW that is provided by the base station, and if not, step 1004 is executed, or otherwise, step 1005 is executed.

The MME can determine whether the UE is within the enterprise network currently according to the access control determination information provided by the base station. If it is not within the enterprise network, it is indicated that the inter-network handover occurs.

At step 1004, the MME triggers the bearer release process or the bearer deactivation process, and ends the procedure.

Likewise, if there is only the connection supporting the SIPTO or LIPA service for the UE, the MME directly triggers the bearer release process or the bearer deactivation process, to release the connection supporting the SIPTO or LIPA service.

If there is another service connection in addition to the connection supporting the SIPTO or LIPA service, another service connection can also perform the location update. The MME can in this exemplary embodiment record the bearer list corresponding to the connection supporting the SIPTO or LIPA service. The bearer list actually contains that performing the location update is not allowed or the optimal bearer is not gained after the location update. The MME can trigger the bearer release process for every bearer in the bearer list during the location update or after the location update, and can also trigger the deactivation process for every bearer in the bearer list after the location update. In this way, when the location update causes that the UE is moved out of the enterprise network, the bearer supporting the SIPTO or LIPA service is released timely, and the UE can re-initiate the bearer establishment process with respect to these services after such bearers are released, thus the optimal bearer is established.

At step 1005, the subsequent location update process is executed.

Heretofore, the procedure of the seventh exemplary embodiment is ended.

Eighth Exemplary Embodiment

Figure 11:
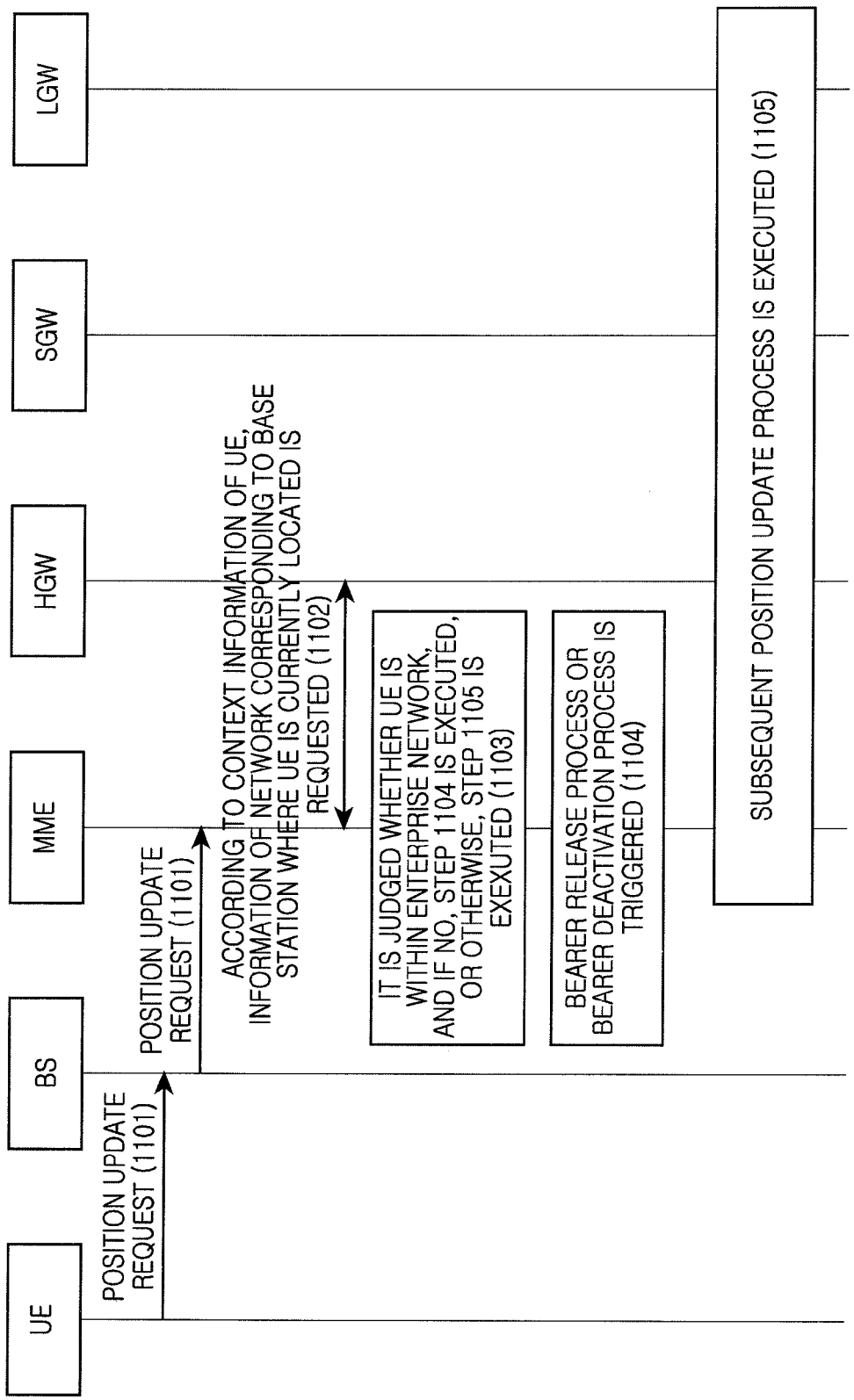
FIG. 11 is a flowchart illustrating a method according to an eighth exemplary embodiment of the present invention.

FIG. 11 is a flowchart illustrating the method according to an eighth exemplary embodiment of the present invention. Referring to FIG. 11, the method includes the following steps.

Step 1101 is the same as Step 901, and the repeated description thereof is omitted.

At step 1102, the MME requests a Home eNodeB Gateway (HGW) to provide the information of the network corresponding to the base station where the UE is currently located according to context information of the UE.

In this step, after receiving the location update request, the MME requests another network node such as the HGW, an Operation Administration and Maintenance (OAM) server and the like for the access control determination information. Specifically, the HGW and the OAM may store the information of the LGW accessed by a home base station and the home base station, or the information of the network where it is located.

The access control determination information can be the information of the network corresponding to the base station where the UE is currently located, the information of the user-plane node accessed by the base station where it is currently located.

At step 1103, the MME determines whether the UE is within the enterprise network according to the information of the network corresponding to the base station where the UE is currently located that is provided by the HGW, and if not, step 1104 is executed, or otherwise, step 1105 is executed.

The MME can determine whether the UE is within the enterprise network currently according to the access control determination information provided by the base station. If it is not within the enterprise network, it is indicated that the inter-network handover occurs.

Steps 1104 to 1105 are the same as steps 904 to 905, and the repeated description thereof is omitted.

Heretofore, the procedure of the eighth exemplary embodiment is ended.

Hereinbelow, the bearer release process presented in the exemplary embodiments described above is described in detail by way of a ninth exemplary embodiment, and the bearer deactivation process presented in the exemplary embodiments described above is described in detail by way of a tenth exemplary embodiment. According to the corresponding entity in the exemplary embodiments described above, the MME involved in the ninth exemplary embodiment and the tenth exemplary embodiment is the MME corresponding to both the source base station and the target base station in the case of the X2 handover, and is the target MME in the case of the S1 handover.

Ninth Exemplary Embodiment

Figure 12:
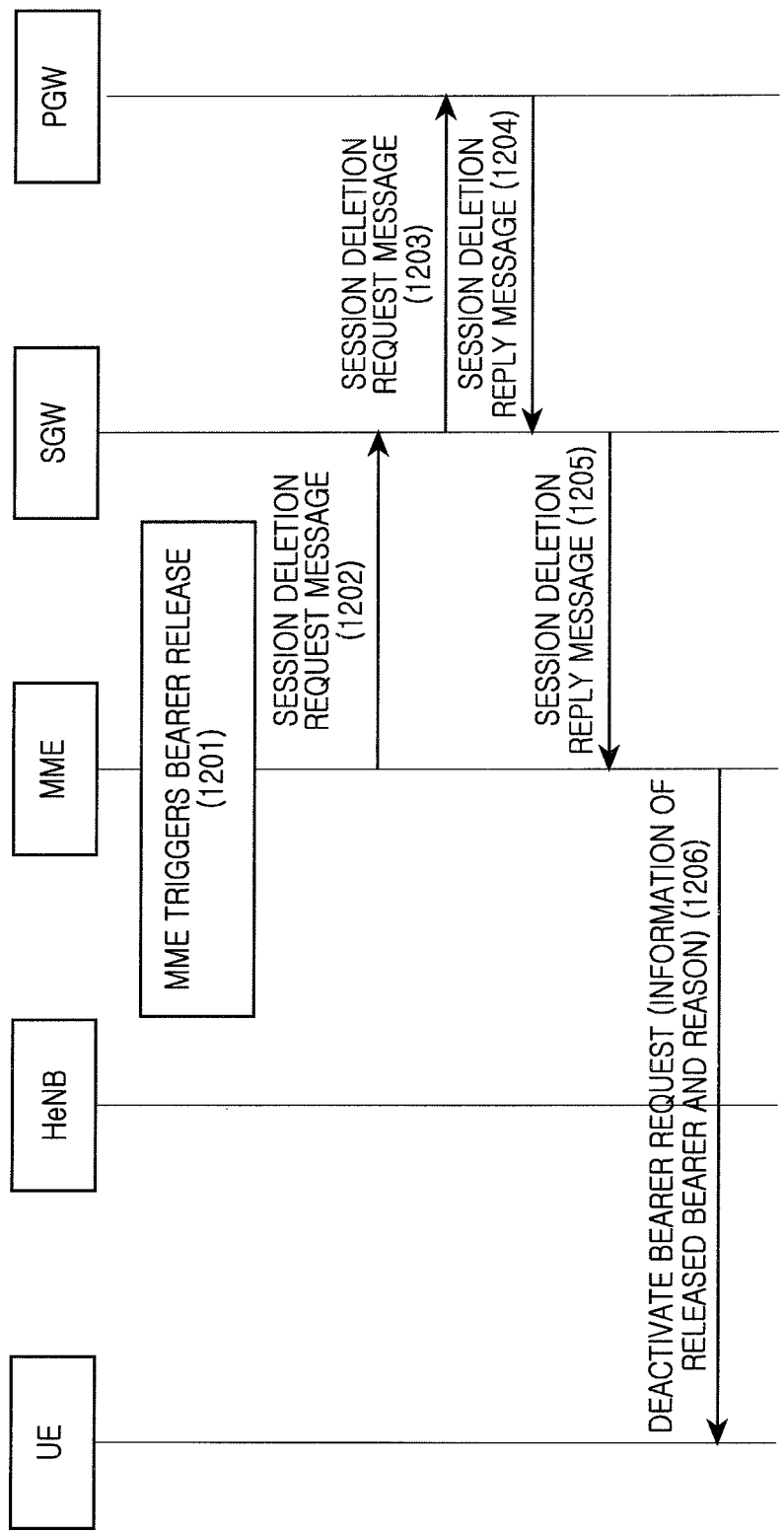
FIG. 12 is a flowchart illustrating a bearer release process according to a ninth exemplary embodiment of the present invention.

FIG. 12 is a flowchart illustrating a bearer release process according to a ninth exemplary embodiment of the present invention. Referring to FIG. 12, the method can include the following steps.

At step 1201, the MME triggers the bearer release procedure.

When it is required to perform the bearer release, the MME first triggers the bearer release process of the PDN connection.

At step 1202, the MME sends a session deletion request message to the SGW. Information of the bearer required to be released is included in the session deletion request message.

At step 1203, the SGW forwards the session deletion request message to a PGW.

At step 1204, the PGW deletes the corresponding bearer according to the information of the bearer that is included in the session deletion request message, and replies with a session deletion reply message.

At step 1205, the SGW forwards the session deletion reply message to the MME.

At step 1206, the MME sends a deactivate bearer request message to the UE, where the information of the released bearer and a related reason are carried in the request message, and the UE can immediately initiate a PDN connection establishment process for re-establishing the bearer according to the request message. The description of the subsequent process is omitted in this specification.

Tenth Exemplary Embodiment

Figure 13:
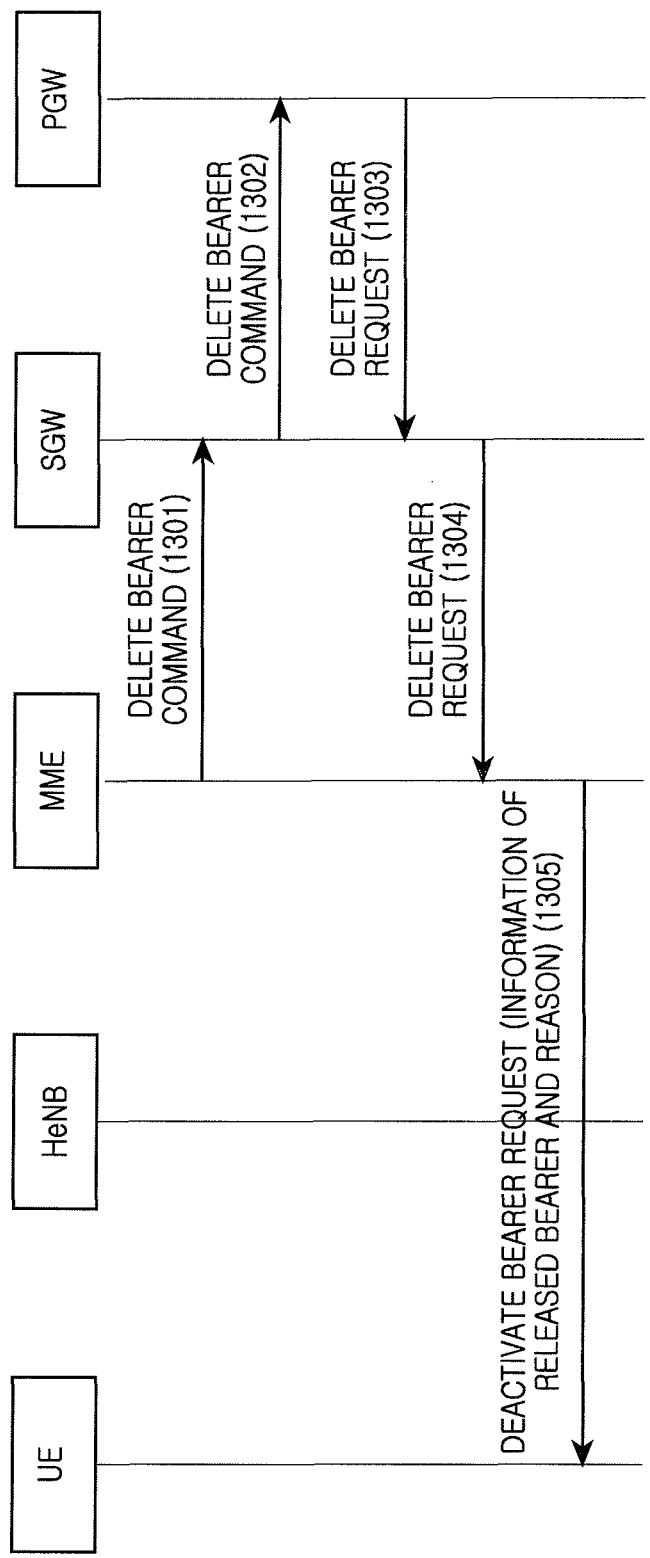
FIG. 13 is a flowchart illustrating a bearer deactivation process according to a tenth exemplary embodiment of the present invention.

FIG. 13 is a flowchart illustrating a bearer deactivation process according to a tenth exemplary embodiment of the present invention. As shown in FIG. 13, the method includes the following steps.

At step 1301, the MME sends a delete bearer command message to the SGW. The information of the bearer required to be deleted is included in the message.

In this step, the bearer required to be deleted can include the bearer in the bearer list failed to perform the handover due to the handover out of the enterprise network during the handover and due to another reason, e.g., the bearer in the list failed to perform the handover resulting from a limited air-interface resource.

At step 1302, the SGW sends the delete bearer command message to the PGW. The deletion requested bearer list is included in the message.

At step 1303, the PGW sends a delete bearer request message to the SGW. The information of the bearer determined to be deleted by the PGW is included in the message.

At step 1304, the SGW forwards the delete bearer request message to the MME.

At step 1305, the MME sends the deactivate bearer request message to the UE, where the information of the deactivated bearer and a related reason are carried in the message, and the UE can immediately initiate the PDN connection establishment process for re-establishing the bearer according to the request message. The description of the subsequent process is omitted in this specification.

The exemplary embodiments described above can be applicable to three LIPA architectures presently available, and can be used for the enterprise network. This can specifically be as follows.

Figure 14A:
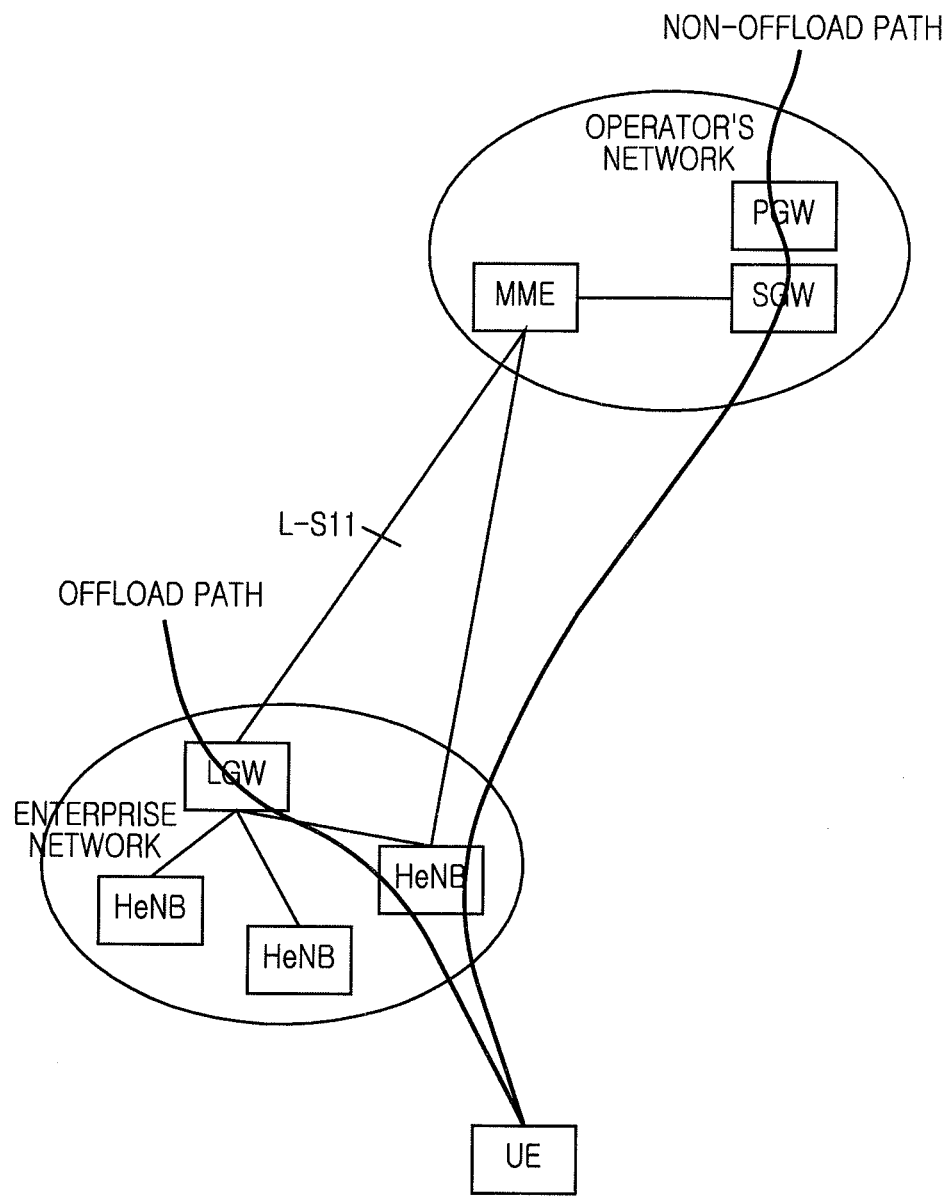
FIG. 14A is a schematic diagram illustrating a first architecture applicable to exemplary embodiments of the present invention.

Architecture 1: As shown in FIG. 14A, an L-S11 interface is adopted between the LGW and the MME. The LGW includes a partial function of the SGW. A control-plane signaling path is HeNB-MME-LGW, an offload user-plane path is HeNB-LGW, and a non-offload user-plane path is HeNB-SGW-PGW. An exemplary embodiment of the present invention corresponds to an offload situation.

Figure 14B:
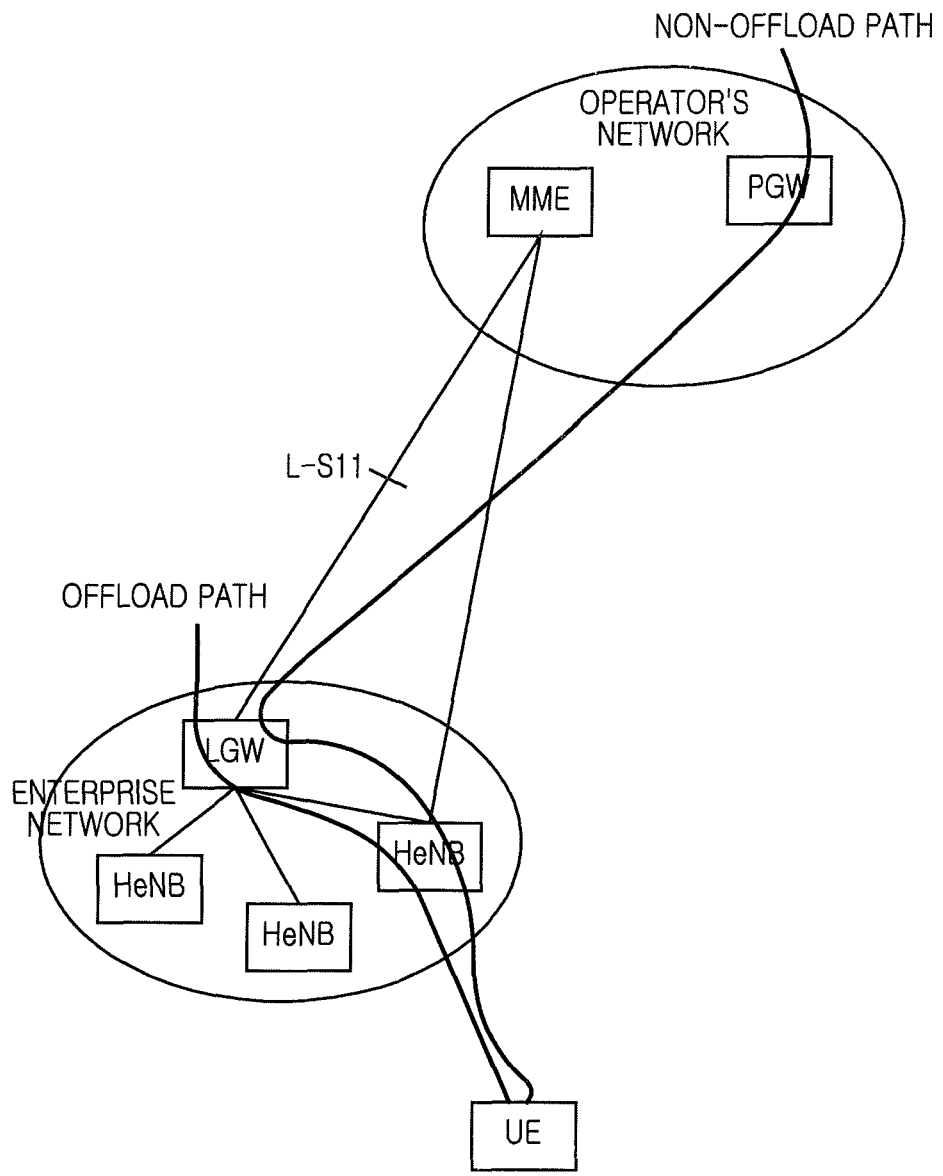
FIG. 14B is a schematic diagram illustrating a second architecture applicable to exemplary embodiments of the present invention.

Architecture 2: As shown in FIG. 14B, this architecture is substantially the same as Architecture 1, and differs in that a dedicated LGW is set to serve the enterprise network. The LGW contains the function of the SGW. The non-offload user-plane path needs only the function of the SGW on the LGW.

Figure 14C:
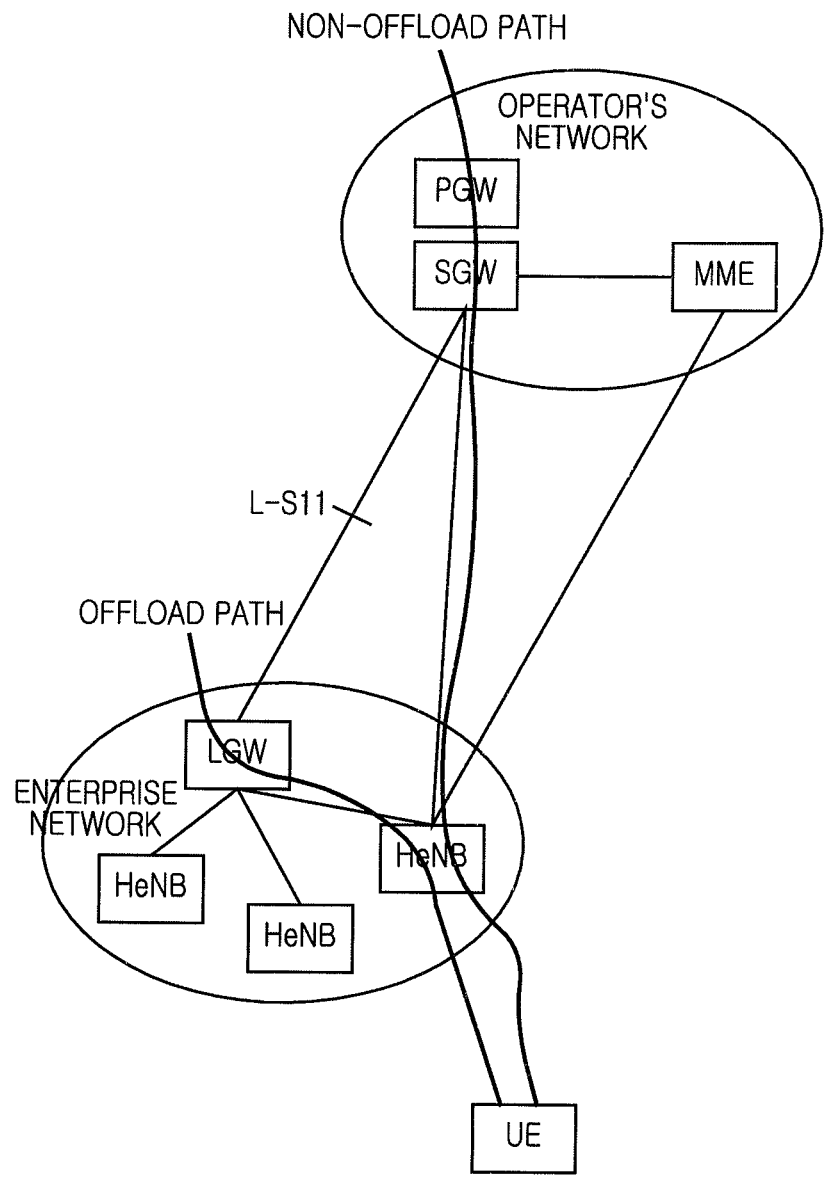
FIG. 14C is a schematic diagram illustrating a third architecture applicable to exemplary embodiments of the present invention.

Architecture 3: As shown in FIG. 14C, the interface for the LGW and the SGW is an S5 interface. For the user of the enterprise network, the control signaling path is HeNB-MME-SGW-LGW. The offload user-plane path is HeNB-LGW, and the non-offload user-plane path is that the HeNB accesses the network of the operator.

If the three architectures are directed to a UMTS network, the LGW is replaced by the GGSN, the HeNB is replaced by the HNB, the MME is replaced by the SGSN, and the SGW and the PGW are replaced by the SGSN and the GGSN respectively. The LGW and the GGSN described above are the user-plane nodes, and the MME and the SGSN are the core network nodes. In addition, in the three architectures, the LGW can be in the same entity as the HeNB. This situation is mainly applied to the home network, and there may be only one serving HeNB in the home network.

It can be seen from the above description that in the method provided by the present invention, before the target core network node updates the wireless bearer information according to the target base station to which the UE performs the handover, an access control determination procedure is added. That is, according to the access control determination information provided by the target base station, if it is determined that the bearer supporting the SIPTO or LIPA service is permitted to perform the handover, the target core network node updates the wireless bearer information. If it is determined that the bearer supporting the SIPTO or LIPA service is not allowed to perform the handover, the handover failure is notified with respect to the bearer not allowed to perform the handover, and the wireless bearer information is not updated, thus the wasted signaling resource and wireless resource are reduced. Alternatively, during the handover to the target network by the UE or after the handover to the target network, the bearer release or deactivation is performed for the bearer not allowed to perform the handover, so that the UE can re-initiate the bearer establishment process with respect to the bearer not allowed to perform the handover, thus an optimized bearer is established and the QoS is ensured.

The foregoing is merely a description of some preferred embodiments of the present invention, and the present invention is not limited thereto. Any modifications, equivalents or improvements made without departing from the spirit and principle of the present invention are intended to fall into the scope of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A handover method for supporting terminal mobility in a target base station, the method comprising:
    receiving, by the target base station, a handover request message, including address information of an anchor Local-GateWay (L-GW) of a Local IP Access (LIPA) Packet Data Network (PDN) connection and information on a LIPA bearer, from a source base station;
    determining, by the target base station, whether the target base station has IP connectivity to the anchor L-GW of the LIPA PDN connection; and
    transmitting, by the target base station, a feedback information indicating whether the target base station supports a connectivity to the anchor L-GW to the source base station.

2. The method of claim 1, further comprising:
    granting, by the target base station, a resource for the LIPA bearer if the target base station has IP connectivity to the anchor L-GW of the LIPA PDN connection.

3. The method of claim 1, further comprising:
    excluding, by the target base station, the LIPA bearer connectivity to the anchor L-GW when granting a corresponding resource for another bearer if the target base station has no IP connectivity to the anchor L-GW of the LIPA PDN connection.

4. The method of claim 1, further comprising:
    transmitting a path switch request message including a tunnel identifier for the LIPA bearer to a Mobile Management Entity (MME); and
    receiving a path switch request ACKnowledgement (ACK) in response to the path switch request message.

5. The method of claim 1, wherein during a handover of a User Equipment (UE) from the source base station to the target base station, the handover is performed as an X2 interface handover between the source base station and target base station.

6. A handover method for supporting terminal mobility in a source base station, the method comprising:
    transmitting, by the source base station, a handover request message, including address information of an anchor Local-GateWay (L-GW) of a Local IP Access (LIPA) Packet Data Network (PDN) connection and information on a LIPA bearer, to a target base station; and
    receiving, by the source base station, feedback information indicating whether the target base station supports connectivity to the anchor L-GW from the target base station.

7. The method of claim 6, further comprising updating, by the source base station, a bearer list with information on the connectivity to the anchor L-GW.

8. The method of claim 6, wherein during a handover of a User Equipment (UE) from the source base station to the target base station, the handover is performed as an X2 interface handover between the source base station and target base station.

9. A target base station apparatus for supporting terminal mobility, the apparatus comprising:
    a receiving unit configured to receive a handover request message, including address information of an anchor Local-GateWay (L-GW) of a Local IP Access (LIPA) Packet Data Network (PDN) connection and information on a LIPA bearer, from a source base station;
    a controller configured to determine whether the target base station has IP connectivity to the anchor L-GW of the LIPA PDN connection; and
    a transmitting unit configured to transmit feedback information indicating whether the target base station supports connectivity to the anchor L-GW to the source base station.

10. The apparatus of claim 9, wherein the controller is configured to grant a resource for the LIPA bearer if the target base station has IP connectivity to the anchor L-GW of the LIPA PDN connection.

11. The apparatus of claim 9, wherein the controller is configured to exclude the LIPA bearer connectivity to the anchor L-GW when granting a corresponding resource for another bearer if the target base station has no IP connectivity to the anchor L-GW of the LIPA PDN connection.

12. The apparatus of claim 9, wherein the transmitting unit is configured to transmit a path switch request message, including a tunnel identifier for the LIPA bearer, to a Mobile Management Entity (MME), and
    wherein the receiving unit is configured to receive a path switch request ack in response to the path switch request message.

13. The apparatus of claim 10, wherein during a handover of a User Equipment (UE) from the source base station to the target base station, the handover is performed as an X2 interface handover between the source base station and target base station.

14. A source base station apparatus for supporting terminal mobility, the apparatus comprising:
    a transmitting unit configured to transmit a handover request message, including address information of an anchor Local-GateWay (L-GW) of a Local IP Access (LIPA) Packet Data Network (PDN) connection and information on a LIPA bearer, to a target base station; and
    a receiving unit configured to receive feedback information indicating whether the target base station supports a connectivity to the anchor L-GW from the target base station.

15. The apparatus of claim 14, further comprising a controller configured to update a bearer list with information on the connectivity to the anchor L-GW.

16. The apparatus of claim 14, wherein during a handover of a User Equipment (UE) from the source base station to the target base station, the handover is performed as an X2 interface handover between the source base station and target base station.

* * * * *